United States Patent
Wakabayashi

(10) Patent No.: US 9,944,820 B2
(45) Date of Patent: Apr. 17, 2018

(54) PRETREATMENT LIQUID, OIL-BASED INK JET PRINTING INK SET, AND OIL-BASED INK JET PRINTING METHOD

(71) Applicant: Seiko Epson Corporation, Tokyo (JP)

(72) Inventor: Shigemi Wakabayashi, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/412,584

(22) Filed: Jan. 23, 2017

(65) Prior Publication Data
US 2017/0210941 A1 Jul. 27, 2017

(30) Foreign Application Priority Data

Jan. 25, 2016 (JP) ................. 2016-011360
Jan. 25, 2016 (JP) ................. 2016-011361

(51) Int. Cl.
| | | |
|---|---|---|
| C09D 173/02 | (2006.01) | |
| C09D 11/40 | (2014.01) | |
| C09D 7/12 | (2006.01) | |
| B41J 2/01 | (2006.01) | |
| C09D 11/36 | (2014.01) | |
| C09D 11/54 | (2014.01) | |
| B41J 2/21 | (2006.01) | |

(52) U.S. Cl.
CPC ............ C09D 173/02 (2013.01); C09D 11/36 (2013.01); C09D 11/40 (2013.01); C09D 11/54 (2013.01); B41J 2/2114 (2013.01)

(58) Field of Classification Search
CPC .... C09D 173/02; C09D 7/1233; C09D 11/40; B41J 2/2144
USPC .......................................................... 347/20
See application file for complete search history.

(56) References Cited

U.S. PATENT DOCUMENTS

2003/0068473 A1* 4/2003 Okumura ................. B41M 5/52
428/195.1
2013/0249996 A1* 9/2013 Saito ........................ C09D 1/00
347/21

FOREIGN PATENT DOCUMENTS

| JP | 2004-217703 A | 8/2004 |
|---|---|---|
| JP | 2009-275211 A | 11/2009 |
| JP | 2013-047289 A | 3/2013 |
| JP | 2013-166813 A | 8/2013 |

* cited by examiner

Primary Examiner — Huan Tran
Assistant Examiner — Alexander D Shenderov
(74) Attorney, Agent, or Firm — Harness, Dickey & Pierce, P.L.C.

(57) ABSTRACT

A pretreatment liquid for an oil-based ink contains one of a maleic anhydride resin derivative and an aluminum chelate compound.

21 Claims, 1 Drawing Sheet

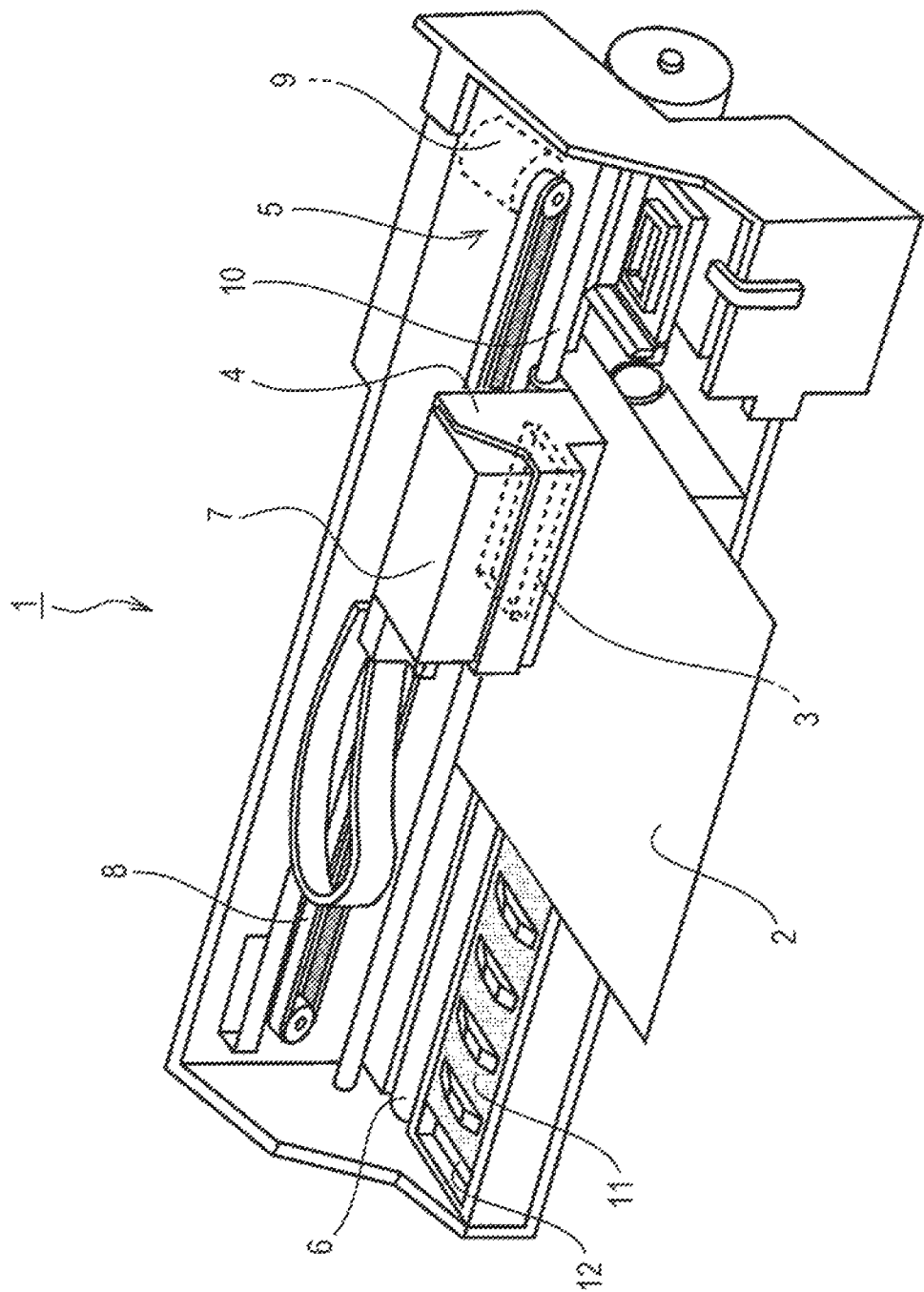

PRETREATMENT LIQUID, OIL-BASED INK JET PRINTING INK SET, AND OIL-BASED INK JET PRINTING METHOD

BACKGROUND

1. Technical Field

The present invention relates to a pretreatment liquid, an oil-based ink jet printing ink set, and an oil-based ink jet printing method.

2. Related Art

Development of office use ink jet printers is underway. Office use printers are required to provide high-quality, high-speed printing on plain paper and other print media and to have a function as a finisher that can, for example, bind printed sheets. Accordingly, the inks used in such printers are required to allow the printer to print high-density images on plain paper at a high speed, and also required to reduce strike-through in view of duplex printing. Furthermore, such inks are required not to cause cockling, curling, or any other deformation of paper after high-speed printing. Aqueous inks containing aqueous solvent can cause deformation of plain paper, such as cockling or curling, when used for high-speed printing. Accordingly, oil-based inks containing an organic solvent, unlikely to cause paper deformation are being developed.

If a volatile organic compound is used as the medium of an oil-based ink, the volatile organic compound can cause health damage such as allergies when being released to environment. Therefore, low-volatile organic compounds are used as the media of oil-based inks. However, if an oil-based ink containing a low-volatile organic compound as the medium is used for printing, the medium is likely to remain in the paper due to the low volatility thereof. The remaining medium can penetrate the paper and thus cause strike-through and bleeding or reduce the print density from the initial print density. If a graphic or a document printed on a print medium with an oil-based ink is put in a polypropylene (PP) clear folder, the organic solvent in the ink can migrate to the clear folder, thereby swelling the inner surfaces of the folder and thus deforming the clear folder in such a manner that both sides thereof warp outwards or waved. In particular, when printed matter created at a high duty is put in a clear folder, the clear folder is warped outwards and the use thereof is hindered.

In an approach to a solution of these disadvantages (for example, JP-A-2009-275211), clear folder deformation is reduced by increasing the viscosity of the ink to suppress the migration of the organic solvent from the print medium to the clear folder, and using a high polar medium to relieve the effect of attacking the clear folder. In this case, the medium is a diester of a polyhydric alcohol and a branched-chain aliphatic carboxylic acid or a diester of a branched-chain aliphatic alcohol and a high aliphatic carboxylic acid.

Unfortunately, if the viscosity of the ink or the polarity of the medium is excessively high, a problem occurs in ejecting ink, or the suppression effect of clear folder deformation is insufficient and lasts only for a short time of not more than about 10 days. Further, printed sheets are likely to stick to each other when a stack thereof has been stored. It is thus difficult to suppress the deformation of the clear folder caused by printed matter created using an oil-based ink for a long time.

SUMMARY

An advantage of some aspects of the invention is that it provides a pretreatment liquid enabling printed matter to be favorably sorted in a clear folder for a long time, and an oil-based ink jet printing ink set and an oil-based ink jet printing method that use the pretreatment liquid.

The subject matter of the invention can be achieved in the following embodiments or applications.

Application 1

According to an aspect of the invention, a pretreatment liquid for an oil-based ink is provided. The pretreatment liquid contains one of a maleic anhydride resin derivative and an aluminum chelate compound.

In the pretreatment liquid, the presence of the maleic anhydride resin derivative or the aluminum chelate compound enables the resulting printed matter to be favorably stored in a clear folder for a long time.

Application 2

In this case, the oil-based ink may contain an organic solvent being at least one selected from the group consisting of alcohols, primary amines, and secondary amines. In this instance, the pretreatment liquid contains a maleic anhydride resin derivative.

When the oil-based ink contains such an organic solvent, the use of the pretreatment liquid containing a maleic anhydride resin derivative enables printed matter to be favorably stored in a clear folder for a long time.

Application 3

In this case, the maleic anhydride resin derivative may be at least one selected from the group consisting of rosin-modified maleic anhydride resins, acrylic-modified maleic anhydride resins, and styrene-modified maleic anhydride resins.

Application 4

In this case, the organic solvent may have a carbon number of 12 or more.

Application 5

In this case, the aluminum chelate compound may be represented by the following general formula (1) or (2):

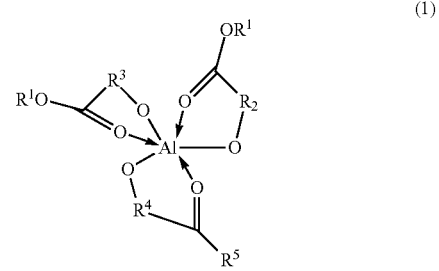

(1)

wherein, $R^1O$ represents a volatile alkoxy group, $R^2$, $R^3$, and $R^4$ each represent an alkyl group, and $R^5$ represents a methyl group or $R^1O$; and

(2)

wherein $R^6O$ represents a volatile alkoxy group, and $R^7$ represents an alkyl group.

Application 6

In this case, the organic solvent in the oil-based ink may be a higher alcohol having a carbon number of 12 or more.

Application 7

According to another aspect of the invention, an oil-based ink jet printing ink set is provided. The ink set includes the above-described pretreatment liquid.

Application 8

According to still another aspect of the invention, an oil-based ink jet printing method is provided which includes printing with the above-described ink set.

BRIEF DESCRIPTION OF THE DRAWINGS

The invention will be described with reference to the accompanying drawing, wherein like numbers reference like elements.

FIGURE is a schematic view of an ink jet printing apparatus used for the oil-based ink jet printing method according to an embodiment of the invention.

DESCRIPTION OF EXEMPLARY EMBODIMENTS

Exemplary embodiments of the invention will now be described. The following embodiments will be described by way of example. The invention is not limited to the disclosed embodiments, and various modifications may be made within the scope and spirit of the invention.

1-1. Pretreatment Liquid

The pretreatment liquid according to an embodiment of the invention is used for an oil-based ink containing an organic solvent. The organic solvent contains at least one selected from the group consisting of alcohols, primary amines, and secondary amines, and the pretreatment liquid contains a maleic anhydride resin derivative.

The pretreatment liquid of the present embodiment is one of the elements of an oil-based ink jet printing ink set used in an oil-based ink jet printing method. The organic solvent in the oil-based ink contains at least one selected from the group consisting of alcohols, primary amines, and secondary amines, and the pretreatment liquid contains a maleic anhydride resin derivative. A combination of an oil-based ink containing such a high polar organic solvent and the pretreatment liquid containing a maleic anhydride resin derivative enables printed matter to be favorably stored in a clear folder for a long time.

The ingredients contained or possibly contained in the pretreatment liquid of the present embodiment will now be described.

1-1. 1. Maleic Anhydride Resin Derivative

The pretreatment liquid of the present embodiment contains a maleic anhydride resin derivative. The maleic anhydride resin derivative is a resin. The pretreatment liquid contains a maleic anhydride resin derivative as a resin and is applied to a print medium for pretreatment of the print medium before printing with the oil-based ink to be described. Consequently, the maleic anhydride resin derivative is rapidly acylated on the surface of the print medium, thereby preventing the ingredients of the oil-based ink from attacking the clear folder.

Preferably, the maleic anhydride resin derivative is in the form of an emulsion. Emulsion of the maleic anhydride resin derivative can keep the viscosity of the pretreatment liquid from increasing compared with a solution of the resin derivative, when the solids contents of the emulsion and the solution are the same. In addition, in spraying of the pretreatment liquid, by keeping the viscosity of the pretreatment liquid low, the pretreatment liquid can be easily applied by spraying, using a roller, or any other known as simple method, and also applied uniformly even if the solids content is high.

Examples of the maleic anhydride resin derivative include, but are not limited to, rosin-modified maleic anhydride resins, acrylic-modified maleic anhydride resins, and styrene-modified maleic anhydride resins.

The content of the maleic anhydride resin derivative (in terms of solids content) is in the range of 1% to 20% by mass, preferably 1% to 16% by mass, and more preferably 3% to 16% by mass, relative to the total mass (100% by mass) of the pretreatment liquid. When the maleic anhydride resin derivative content is in such a range, the pretreatment liquid can be easily applied and can improve clear folder storage effectively.

1-1. 2. Liquid Medium

The pretreatment liquid of the present embodiment contains a liquid medium in which the maleic anhydride resin derivative is dispersed. The liquid medium may be an aqueous solvent or an organic solvent. Aqueous solvent, in general, contains water, and the aqueous solvent used in the pretreatment liquid of the present embodiment may be water or a water-soluble organic solvent. The water may be, but is not limited to, pure water or ultrapure water, such as ion exchanged water, ultrafiltered water, reverse osmotic water, or distilled water. The organic solvent may be a known vegetable oil and/or petroleum solvent, and also may be a polar organic solvent or a nonpolar organic solvent. From the viewpoint of environmental protection, a low volatile organic solvent is preferred among the liquid medium to be used.

The liquid medium content can be appropriately determined without particular limitation and may be in the range of 70% to 95% by mass relative to the total mass (100% by mass) of the pretreatment liquid.

1-1. 3. Other Ingredients

The pretreatment liquid of the present embodiment may further contain other additives that are generally contained in ordinary pretreatment liquids. Such additives include, but are not limited to, a flocculant, a surfactant, a pH adjuster, a preservative, a fungicide, a thickener, and a chelate compound.

Flocculant

The flocculant has the function of reacting with the coloring material or the resin in the oil-based ink and thereby forming an aggregate of these ingredients of the ink. Thus, the flocculant improves the quality of the image formed with the oil-based ink and suppresses bleeding and, in addition, improves clear folder storage.

Examples of the flocculant include, but are not limited to, organic acids, such as acetic acid, propionic acid, and lactic acid, and salts thereof, polyallylamines, polyallylamine derivatives, and polyvalent metal compounds. Polyvalent metal compounds and organic acids are advantageous from the viewpoint of forming an aggregate of the coloring material, and polyvalent metal compounds are particularly advantageous. If a polyvalent metal compound is used, the content of the metal ion of the polyvalent metal compound in the pretreatment liquid, that is, the concentration of the metal ion derived from the polyvalent metal compound, is preferably in the range of 0.5% to 5% by mass, more preferably 1% to 5% by mass, relative to the total mass (100% by mass) of the pretreatment liquid.

Surfactant

The surfactant may be an acetylene glycol-based surfactant, a silicone surfactant, or a fluorosurfactant.

Examples of the acetylene glycol-based surfactant include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each product name, produced by Air Products and Chemicals. Inc.); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each product name, produced by Nissin Chemical Industry); and ACETYLENOL series E00, E00P, E40, and E100 (each product name, produced by Kawaken Fine Chemicals).

Examples of the silicone surfactant include, but are not limited to, polysiloxane-based compounds. For example, a polyether-modified organosiloxane may be used as the polysiloxane-based compound. Polyether-modified organosiloxanes are available from the market, such as BYK-306, BYK-307, BYK-333, BYK-341, BYK-345, BYK-346, and BYK-348 (each product name, produced by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each product name, produced by Shin-Etsu Chemical).

The fluorosurfactant may be a fluorine-modified polymer, such as BYK-340 (produced by BYK Japan KK).

If the pretreatment liquid contains a surfactant, the content thereof may be in the range of 0.05% to 2.0% by mass relative to the total mass of the pretreatment liquid.

pH Adjuster

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Preservative, Fungicide, and Rust Preventive

Examples of the preservative or fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives or fungicides include Proxel XL2 and Proxel GXL (each product name, produced by Avecia), and Denicide CSA and NS-500W (each product name, produced by Nagase Chemtex). Benzotriazole or the like may be used as a rust preventive.

Thickener

Examples of the thickener include polyvinyl alcohols, poly(meth)acrylic acids, polyethers, polyvinyl pyrrolidones, polyvinyl formals, protein, such as gelatin, casein, and glue, polysaccharide, such as pullulan, dextran, dextrin, cyclodextrin, carrageenan, pectin, glucomannan, sodium alginate, xanthan gum, Arabic gum, locust bean gum, tragacanth gum, guar gum, and tamarind gum, starches, such as starch, oxidized starches, carboxy starches, and dialdehyde starches, cellulose and derivatives thereof, such as methyl cellulose, ethyl cellulose, carboxymethyl cellulose, hydroxyethyl cellulose, hydroxypropyl cellulose, and (hydroxypropyl)methyl cellulose, alginic acid salts, such as sodium alginate, potassium alginate, and ammonium alginate, and alginic acid esters, such as propylene glycol alginate. If the pretreatment liquid contains a thickener, the content thereof may be, but is not limited to, 20% by mass or less relative to the total mass of the pretreatment liquid.

Chelate Compound

The chelate compound may be a known aluminum chelate compound.

1-1. 4. Preparation of Pretreatment Liquid

The pretreatment liquid of the present embodiment may be prepared by mixing the above-described ingredients (materials) in an arbitrary order and optionally removing impurities by, for example, filtration. For preferably mixing the materials, the materials may be added one after another into a container equipped with a stirrer, such as a mechanical stirrer or a magnetic stirrer, and mixed together by stirring. For filtration, a centrifugal filter, a membrane filer, or any other filter may be used.

1-1. 5. Physical Properties of Pretreatment Liquid

The pretreatment liquid of the present embodiment preferably has a viscosity of 30 mPa·s or less, more preferably 25 mPa·s or less, still more preferably 20 mPa·s or less, still more preferably 15 mPa·s or less, still more preferably 10 mPa·s or less, or still more preferably 5 mPa·s or less, at 20° C. from the viewpoint of being reliably ejected through nozzles by an ink jet method or a spray method, or being easily applied with a roll coater or the like. The lower limit of the viscosity is preferably, but is not limited to, 1 mPa·s. The viscosity can be measured at 20° C. with a viscoelasticity meter MCR-300 (product name, manufactured by Anton Paar Japan K.K.).

1-1. 6. Use

The pretreatment liquid of the present embodiment is applied onto a print medium, such as a paper sheet, by painting, jetting, or spraying before printing with a known ink jet printing apparatus. Consequently, the maleic anhydride resin derivative is rapidly acylated on the surface of the print medium, thereby preventing the ingredients of the oil-based ink from attacking the clear folder.

The pretreatment liquid may be applied by any technique. For example, the print medium may be immersed in the pretreatment liquid or painted with the pretreatment liquid by using a roll coater or the like, or the pretreatment liquid may be ejected. For ejecting the pretreatment liquid, an ejection apparatus of, for example, a spray type or an ink jet type may be used. In this instance, the ejection apparatus ejects the pretreatment liquid in a state not in contact with the print medium.

1-2. Oil-Based Ink

The oil-based ink used in the present embodiment is combined with the above-described pretreatment liquid to constitute an oil-based ink jet printing ink set according to the present embodiment. The oil-based ink jet printing ink set disclosed herein includes the above-described pretreatment liquid, and at least one color ink composition (for example, white, cyan, magenta, yellow, or black ink composition) as the oil-based ink. The oil-based ink may be a clear ink not containing a coloring material.

The oil-based ink contains an organic solvent. The organic solvent contains at least one selected from the group consisting of alcohols, primary amines, and secondary amines. In the present embodiment, the oil-based ink may be used as an artists' oil paint, a paint, a writing ink such as that for a fountain pen, or a printing ink without particular limitation.

The term "oil-based ink" used herein refers to an ink containing mainly an organic solvent and substantially free from water. The phrase "substantially free from water" mentioned herein means that the ink is prepared without intentionally adding water and implies that a trace amount of water unavoidably added during preparation or storage may be contained.

The water content in the "oil-based ink substantially free from water" is preferably 3% by mass or less, more preferably 1% by mass or less, and still more preferably less than 0.05% by mass, still more preferably less than 0.01% by mass, still more preferably less than 0.005% by mass, or still more preferably less than 0.001% by mass.

In the present embodiment, a case where the oil-based ink is used as an oil-based ink jet printing ink composition (hereinafter also described as "ink") will be described by way of example, and essential ingredients and optionally added ingredients of the oil-based ink jet ink composition will be described.

1-2. 1. Coloring Material

The oil-based ink used in the present embodiment contains a coloring material. The coloring material may be an oil-based dye, inorganic color pigment or organic color pigment conventionally used in general oil-based ink jet ink compositions. These coloring materials may be used singly or in combination.

If a pigment is used, the average particle size of the pigment in the dispersion of the ink is in the range of 20 nm to 200 nm, and any known inorganic or organic pigment may be used without particular limitation as long as the hue thereof is white, black, yellow, magenta, cyan, red, green, blue, or orange.

Examples of the pigment include azo pigments, such as azo lake, insoluble azo pigments, condensed azo pigments, and chelate azo pigments; polycyclic pigments, such as phthalocyanine pigments, perylene and perylene pigments, anthraquinone pigments, quinacridone pigments, dioxazine pigments, thioindigo pigments, isoindolinone pigments, and quinophthalone pigments; dye lakes, such as basic dye lakes and acid dye lakes; other organic pigments, such as nitro pigments, nitroso pigments, aniline black, and daylight fluorescent pigments; and inorganic pigments, such as carbon black.

More specifically, examples of the pigment for a magenta or red ink as the oil-based ink jet ink composition of the present embodiment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, C.I. Pigment Red 224, and C.I. Pigment Violet 19.

When the oil-based ink of the present embodiment is an orange or a yellow ink, examples of the pigment include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

When the oil-based ink is a green or a cyan ink, examples of the pigment include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and C.I. Pigment Green 36.

When the oil-based ink is a black ink, the pigment may be carbon black.

For an oil-based white ink, examples of the pigment include C.I. Pigment White 6, C.I. Pigment White 18, and C.I. Pigment White 21.

The pigment is commercially available. Suitable and commercially available black pigments include Mitsubishi Chemical carbon blacks MA11, MA100, MA220, MA600a, #40, and #44. Pigments for other colors include SYMULER Brilliant Carmine 6B, SYMULER Red, FASTOGEN Super Magenta, SYMULER Fast Yellow, FASTOGEN Blue 4RO-2, FASTOGEN Green, and FASTOGEN Super Violet, each produced by DIC. These pigments may be used singly or in combination.

The pigment content in the oil-based ink used in the present embodiment is appropriately determined according to the use or printing properties, and is preferably in the range of 0.01% to 20% by mass, more preferably 0.5% to 15% by mass, and still more preferably 1% to 10% by mass, relative to the total mass (100% by mass) of the ink from the viewpoint of obtaining a good hiding property and good color reproduction.

Preferably, the pigment has an average particle size in the range of 20 nm to 200 nm, as mentioned above. Such a pigment improves color developability, and accordingly, the oil-based ink is suitable for use as an ink jet ink. Also, a pigment having an average particle size of 200 nm or less is suitable for use in an ink jet technique. More preferably, the average particle size is in the range of 50 nm to 150 nm. The oil-based ink containing such a pigment is superior in storage stability, ejection stability, and sedimentation when used as an ink jet ink.

The average particle size mentioned herein refers to a sphere-equivalent 50% average particle size (d50) in an ink measured by a light scattering method. The "sphere-equivalent 50% average particle size (d50) by the light scattering method" can be obtained as below. Diffracted/scattered light generated by irradiating particles in a dispersion medium with light is measured with detectors disposed in front, side and back of the dispersion medium. With the assumption that particles, which are naturally indefinite in shape, are spherical, a cumulative curve is obtained from the measurement results with respect to the total volume (100%) of the spherical particles calculated from the volumes of measured particles, and the point where the cumulative value is 50% is defined as the sphere-equivalent 50% average particle size (d50).

If a pigment is used as the coloring material, a dispersant selected from the known dispersants used in ordinary oil-based inks may be used for improving stability in dispersing the pigment in the oil-based ink. In the present embodiment, any pigment dispersant may be used as long as it can stably disperse the pigment in a dispersion medium, and examples of the dispersant include Solsperse 5000, Solsperse 13940, Solsperse 11200, Solsperse 21000, and Solsperse 28000, each produced by Lubrizol.

The dispersant content in the oil-based ink used in the present embodiment may be appropriately determined according to the pigment to be dispersed, and is preferably in the range of 5 parts by mass to 200 parts by mass, more preferably 30 parts by mass to 120 parts by mass, relative to 100 parts by mass of the pigment in the oil-based ink.

If the oil-based ink contains a dye, the dye is commercially available, and preferred examples thereof include black dyes produced by Orient Chemical Industries, such as VALIFAST BLACK 3810, elixa Black 846, OIL BLACK HBB, and OIL BLACK No. 5, and other color dyes, such as OIL BLUE 2N, elixa Orange-240, VALIFAST BLUE 1603, elixa Green-502, VALIFAST ORANGE 1201, OIL GREEN 530, elixa Green-540, OIL YELLOW GG-S, elixa Yellow-129, and VALIFAST YELLOW 1101. These dyes may be used singly or in combination.

1-2. 2. Organic Solvent

The oil-based ink used in the present embodiment contains an organic solvent containing at least one selected from the group consisting of alcohols, primary amines, and secondary amines. The term "organic solvent" used herein refers to an organic solvent that is liquid at room temperature under normal pressure and is a constituent of the liquid medium in which the coloring material, such as a pigment, is dispersed. If the liquid medium is a mixture of an organic solvent and any other substance, the liquid medium contains more than 5% by mass of organic solvent.

When the oil-based ink used in the present embodiment contains at least one selected from the group consisting of alcohols, primary amines, and secondary amines as the organic solvent, the clear folder is kept from being deformed and, in combined use of pretreatment with the above-described pretreatment liquid, can more favorably store printed matter therein.

Examples of the alcohol used as the organic solvent include, but are not limited to, primary to tertiary alcohols and monohydric to trihydric alcohols. The hydrocarbon group of the alcohol may be saturated or unsaturated, or may be linear or branched. Similarly, the hydrocarbon group of the primary amine or the secondary amine used as the organic solvent may have any structure, as long as the organic solvent has a high polarity and can suppress the deformation of the clear folder.

Preferably, the organic solvent has a carbon number of 12 or more. Such an organic solvent has a higher polarity and can suppress the deformation of the clear folder. Examples of the organic solvent having a carbon number of 12 or more include 1-dodecanol, hexadecanol, and oleyl alcohol. These organic solvents may be used singly or in combination.

The organic solvent content in the oil-based ink is preferably 80% by mass or more, more preferably 90% by mass or more, relative to the total mass (100% by mass) of the ink composition.

1-2. 3. Other Ingredients

The oil-based ink used in the present embodiment may further contain other additives that are generally contained in ordinary oil-based inks. Examples of such an additive include an organic solvent other than the organic solvent described above, a stabilizer, such as an antioxidant or an ultraviolet absorbent, a binder resin, a metal soap, and a metal complex.

Other Organic Solvents

The organic solvent other than the above-described organic solvent may be polar or nonpolar, and examples thereof include esters of a drying oil fatty acid and an alcohol, organic solvents having a high solubility parameter (SP) value and high iodine value, and drying oil.

Exemplary nonpolar organic solvents include hydrocarbon solvents, such as naphthene, paraffin, and isoparaffin, fluorocarbon solvents, and silicone solvents. Some of these nonpolar organic solvents are commercially available, and examples thereof include dodecane and other saturated aliphatic hydrocarbons; ISOPAR and Exxsol, each produced by Exxon Mobil; AF Solvent and Normal Paraffin H, each produced by JX Nippon Oil & Energy; AS sol produced by WILLVE; Dust Clean series produced by Matsumura Oil; SUNTHENE series and SUNPAR series, each produced by Japan Sun Oil Company; and Surflon series produced by AGC Seimi Chemical.

Exemplary polar organic solvents include ester-based solvents, alcohol-based solvents, amide-based solvents, fatty acid-based solvents, and ether-based solvents.

For example, the ester-based solvent may be a higher fatty acid ester having a carbon number of 5 or more, preferably 9 or more, more preferably 12 to 32, and examples thereof include isodecyl isononanoate, isotridecyl isononanoate, isononyl isononanoate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, diisopropyl adipate, diisopropyl sebacate, diethyl sebacate, propylene glycol monocaprylate, trimethylolpropane tri-2-ethylhexanoate, and glyceryl tri(2-ethylhexanoate). Furthermore, ester-based solvents include esters of a drying oil fatty acid and an alcohol, such as soybean oil fatty acid methyl ester, soybean oil fatty acid isobutyl ester, linseed oil fatty acid methyl ester, linseed oil fatty acid butyl ester, linseed oil fatty acid propyl ester, linseed oil fatty acid 2-ethylhexyl ester, tung oil fatty acid methyl ester, tall oil fatty acid methyl ester, and tall oil fatty acid isobutyl ester.

The alcohol-based solvent may be a higher aliphatic alcohol having a carbon number of 12 or more, and examples thereof include isomyristyl alcohol, isopalmityl alcohol, isostearyl alcohol, and oleyl alcohol.

Examples of amide-based solvents include acetamide, dimethylacetamide, and N-methylpyrrolidinone.

The fatty acid-based solvent may be a fatty acid having a carbon number of 4 or more, preferably 9 to 22, and examples thereof include isononanoic acid, isomyristic acid, hexadecanoic acid, isopalmitic acid, oleic acid, and isostearic acid.

Examples of ether-based solvents include glycol ethers, such as diethylene glycol monobutyl ether, ethylene glycol monobutyl ether, propylene glycol monobutyl ether, and propylene glycol dibutyl ether; and glycol ether acetates.

Esters of a drying oil fatty acid and an alcohol have low viscosities. Even if a large amount of such an ester is used in an ink jet printing ink, it does not affect the ejection of the ink. Also, such esters do not attack polypropylene (PP), which is the material of the clear folder, and those having many double bonds help the oxidative polymerization of the ink. Therefore, by adding an ester of a drying oil fatty acid and an alcohol to the ink used in the present embodiment, the ink can have a low viscosity before being printed, while, after being printed, the ink is rapidly hardened to have a high viscosity, thus fixing the organic solvent therein in the resulting printed matter. Accordingly, the organic solvent is kept from migrating from the printed matter to the clear folder even if the printed matter is held in a clear folder. Thus, the printed matter can be stably stored in the clear folder.

The drying oil fatty acid that is a constituent of the above ester is produced from a drying oil by hydrolysis. Examples of the drying oil to be described later include linseed oil, tung oil, mustard oil, perilla oil, walnut oil, safflower oil, and sunflower oil. Hydrolysis of the drying oil can be performed by a known method.

The alcohol that is a constituent of the above ester may be unsaturated and the carbon number thereof is not limited. However, since the ester hydrolyzes on the print medium immediately after printing and the alcohol produced by the hydrolysis can migrate to the clear folder, the composition of the ink should be determined according to the carbon number of the alcohol.

In the case where the alcohol has a carbon number of 3 or less, even if the alcohol migrates from the print medium to the clear folder and deforms the clear folder, the clear folder tends to recover because of the volatility of the alcohol, while the ester of the alcohol severely attacks PP. It is therefore desirable to complete the oxidative polymerization of the ink before the organic solvent migrates to the clear folder and thus to prevent the alcohol produced by the hydrolysis from migrating to the clear folder. It is desirable to use a metal soap or a metal complex together to promote hardening.

In the case where the alcohol has a carbon number of 4 or more, while the alcohol does not severely attack PP, the alcohol produced by hydrolysis is likely to migrate to the clear folder and thus to deform the clear folder because of the low volatility of the alcohol. In this instance, if the ink contains a metal soap or a metal complex, the hydrolysis of the ester is promoted. It is desirable that the ink do not contain a metal soap or a metal complex.

The ester of a drying oil fatty acid and an alcohol can be produced by a known method without particular limitation, and, for example, any one of the methods disclosed in JP-A-2005-53871, JP-A-2009-203343, and JP-A-2011-99009 may be applied.

The term SP value refers to the solubility parameter and can be calculated by using Fedors's calculation described in Research on Coatings No. 152 (2010) P.43. The iodine value is a value calculated by, for example, the method specified in JIS K 3331: 2009, Hardened oils and fatty acids for industrial use.

The above-cited organic solvents have high SP values and accordingly do not severely attack PP, and also promote the oxidative polymerization of the ink because of the presence of many double bonds in the molecule thereof. Therefore, by adding any of those organic solvents to the ink of the present embodiment, the ink is rapidly hardened after being printed, thus fixing the organic solvent in the ink in the print medium. Accordingly, the remaining organic solvent is kept from migrating from the printed matter to the clear folder even if the printed matter is held in a clear folder. Thus, the printed matter can be stably stored in the clear folder.

Examples of such an organic solvent include linolenic acid monoglyceride (SP value: 10.3, iodine value: 216), the above-described esters of a drying oil fatty acid and an alcohol. These organic solvents may be used singly or in combination.

The organic solvent having a high SP value and a high iodine value may contain an allyl compound. α-Carbons of allyl compounds are likely to cause crosslinking reaction. Accordingly, when the ink contains an allyl compound as an organic solvent, the oxidative polymerization of the ink is promoted. Therefore, by using an allyl compound in the ink used in the present embodiment, the ink can have a low viscosity before being printed, while, after being printed, the ink is rapidly hardened to have a high viscosity, thus fixing the organic solvent therein in the print medium. Accordingly, the organic solvent is kept from migrating from the printed matter to the clear folder even if the printed matter is held in a clear folder. Thus, the printed matter can be stably stored in the clear folder.

The allyl compound is preferably, but is not limited to, a highly reactive compound that does not severely attack PP. Allyl ethers are particularly advantageous from the viewpoint of reactivity.

Drying oils are viscous and, accordingly, an ink jet printing ink containing a large amount of drying oil has a problem in ejection. However, drying oils do not attack polypropylene (PP), which is the material of the clear folder, and those having many double bonds help the oxidative polymerization of the ink. Therefore, auxiliary use of a drying oil in the ink of the present embodiment helps the ink harden rapidly after printing and, thus, the organic solvent in the ink is fixed in the print medium. Accordingly, the organic solvent is kept from migrating from the printed matter to the clear folder even if the printed matter is held in a clear folder. Thus, the printed matter can be stably stored in the clear folder.

The drying oil used herein refers to an oil that can harden completely in air and has an iodine value of 130 or more, and examples thereof include linseed oil, tung oil, mustard oil, perilla oil, walnut oil, safflower oil, and sunflower oil. These drying oils may be used singly or in combination.

If a drying oil is added, its content is preferably in the range of 0.05% to 10% by mass relative to the total mass of the oil-based ink from the viewpoint of stable ejection of the ink.

Antioxidant

Examples of the antioxidant include BHA (2,3-butyl-4-oxyanisole) and BHT (2,6-di-t-butyl-p-cresol).

Ultraviolet Absorbent

Examples of the ultraviolet absorbent include benzophenone-based compounds and benzotriazole-based compounds.

Binder Resin

The oil-based ink used in the present embodiment may contain a binder resin to control the viscosity of the oil-based ink. Examples of the binder resin include acrylic resins, styrene acrylic resins, rosin-modified resins, phenol resins, terpene resins, polyester resins, polyamide resins, epoxy resins, vinyl chloride-vinyl acetate copolymer resins, cellulose acetate butyrate and other textile fabric resins, and vinyl toluene-α-methylstyrene copolymer resins. These binder resins may be used singly or in combination. The fixability of the ink to the print medium can be further enhanced by varying the binder resin content in the ink.

Metal Soap or Metal Complex

Metal soaps and metal complexes, which are often called a dryer (hardening accelerator), can act as an oxidizing agent to help the oxidative polymerization of the organic compound in the above-described organic solvent. Therefore, when the oil-based ink is used for printing on a print medium, such as a paper sheet, the ink is rapidly hardened after being printed, thus fixing the organic solvent therein in the print medium. Accordingly, the organic solvent is kept from migrating from the printed matter to the clear folder even if the printed matter is held in a clear folder. Thus, the clear folder is prevented from being deformed.

In the present embodiment, the metal of the metal soap or metal complex may be at least one selected from the group consisting of Co (cobalt), Mn (manganese), Pb (lead), Zr (zirconium), Ca (calcium), Ba (barium), K (potassium), and Fe (iron). In the present embodiment, the metal soap or metal complex is a metal salt of an organic acid. Any of the organic acids generally used as the material of the dryer may be used as the raw material of the organic acid metal salt without particular limitation. More specifically, the organic acid may be selected from among propionic acid, octylic acid, naphthenic acid, neodecanoic acid, tung oil acid, linseed oil acid, soybean oil acid, and resin acid. From the viewpoint of producing good effect in promoting drying, aliphatic monocarboxylic acids having a carbon number of 3 to 12 are advantageous, and octylic acid, naphthenic acid, and neodecanoic acid are more advantageous. These organic acids may be used singly or in combination.

Cobalt salts of those compounds (metal salts) containing any of the above-cited metals help oxidation at the interface between the coating film of the ink and air, while salts of the other metals, such as manganese salts, act for surface oxidation and also on the inside of the coating film, thus helping the polymerization of the entire ink. Auxiliary dryers such as zirconium salts and calcium salts can improve the total characteristics of the ink when used in combination with the above-described dryer, but are hardly effective when used singly.

The organic acid metal salt used in the present embodiment may be represented by general formula (A): $(OMR)_3$. In formula (A), M represents a cobalt atom or a manganese atom; R represents an organic acid group, and the three Rs may be the same or different.

More specifically, the organic acid group R is an acyl group of an organic acid, such as propionic acid, octylic acid, naphthenic acid, neodecanoic acid, tung oil acid, linseed oil acid, soybean oil acid, and resin acid, and is preferably an acyl group of an aliphatic monocarboxylic acid having a carbon number of 3 to 12, and more preferably an acyl group of octylic acid, naphthenic acid, or neodecanoic acid.

Although a cobalt or manganese dryer is used as the metal soap or metal complex in the present embodiment as described above, a manganese dryer is advantageous in view of the environment where it is used. Manganese is however less active to cobalt. If a manganese dryer is used, it is advantageous to use the manganese dryer together with a ligand capable of activating the manganese dryer. The compound acting as the ligand may be 2,2'-bipyridine, 2-(aminomethyl)pyridine, or 2-(hydroxymethyl)pyridine. These ligand compounds may be used singly or in combination.

A preferred manganese dryer is manganese neodecanoate and is also commercially available as, for example, DICNATE Mn 6.5% SB produced by DIC.

Other organic acid metal salts capable of being used as the dryer include organic acid cobalt boron metal salts and organic acid manganese boron metal salts. These may be used singly or in combination. Combined use thereof is advantageous for drying thick coating films that are considered to be difficult to harden uniformly. Furthermore, combined use of an organic acid cobalt boron metal salt, an organic acid manganese boron metal salt, and an organic acid manganese metal salt is also advantageous for drying thick coating films. Also, combined use of an organic acid cobalt boron metal salt and an organic acid manganese metal salt advantageously provides an inexpensive dryer that satisfactorily promotes drying.

The organic acid metal salt used in the present embodiment can be produced by a known method without particular limitation, and, for example, the method disclosed in JP-B-63-63551 may be applied.

The organic acid metal salt may be diluted with an organic solvent in advance before being added to the oil-based ink, from the viewpoint of ease handling and uniformity of the mixture. Any organic solvent may be used as diluent as long as it can uniformly dissolve the organic acid metal salt and is chemically inert to the organic acid metal salt, and examples thereof include hydrocarbons, such as toluene, xylene, heptane, hexane, cyclohexane, and mineral spirit; alcohols, such as methanol, ethanol, propanol, and cyclohexanol; ketones, such as methyl ethyl ketone, methyl isobutyl ketone, and cyclohexanone; and ethers, such as propyl ether, methyl cellosolve, cellosolve, butyl cellosolve, methyl Carbitol, and butyl Carbitol. These may be used singly or in combination.

1-2. 4. Preparation of Oil-Based Ink

The oil-based ink used in the present embodiment can be prepared by a conventional method. If a pigment is used as the coloring material, a pigment dispersion liquid having desired properties is first prepared by mixing the pigment, a dispersant, and a portion of an organic solvent, and agitating the mixture with a ball mill, a bead mill, an ultrasonic mill, a jet mill, or the like. Subsequently, the rest of the organic solvent and other additives, such as a surfactant and a binder resin, are added to the dispersion liquid with stirring to yield the oil-based ink.

1-2. 5. Physical Properties

Preferably, the oil-based ink has a surface tension at 20° C. in the range of 20 mN/m to 50 mN/m, more preferably in the range of 25 mN/m to 40 mN/m, from the viewpoint of the balance between the quality of printed matter and the reliability of the ink composition as an ink jet ink. The surface tension can be determined by measuring the ink wetting a platinum plate at 20° C. with an automatic surface tensiometer CBVP-Z (manufactured by Kyowa Interface Science).

Also, from the same viewpoint as above, the oil-based ink preferably has a viscosity in the range of 2 mPa·s to 30 mPa·s, more preferably in the range of 2 mPa·s to 20 mPa·s, at 20° C. The viscosity can be measured with a viscoelasticity meter MCR-300 (manufactured by Anton Paar Japan K.K.) by increasing the shear rate to 10 to 1000 at 20° C. and reading the indicated value of the meter at a shear rate of 200.

1-2. 6. Use

The oil-based ink used in the present embodiment is introduced to an ink cartridge of a known ink jet printing apparatus, and droplets of the ink are ejected and applied onto a print medium, thus printing images. Preferably, the ink jet printing apparatus includes an electrostrictive element that vibrates according to electrical signals and is configured to eject ink by the vibration of the electrostrictive element. Since the oil-based ink used in the present embodiment contains an organic solvent containing at least one selected from the group consisting of alcohols, primary amines, and secondary amines, the clear folder is kept from being deformed by the organic solvent in the printed image. Also, combined use of the oil-based ink with the above-described pretreatment liquid prevents the resulting printed matter from deforming the clear folder for a long time.

1-3. Oil-Based Ink Jet Printing Method

The oil-based ink jet printing method according to an embodiment of the invention will now be described. The oil-based ink jet printing method includes printing with an oil-based ink jet printing ink set including the above-described pretreatment liquid and oil-based ink.

1-3. 1. Ink Jet Printing Apparatus

An exemplary ink jet printing apparatus used for the ink jet printing method of the present embodiment will be described with reference to FIGURE. The oil-based ink jet printing method may be used in any ink jet printing apparatus without particular limitation.

The ink jet apparatus may be an ink jet printer (hereinafter, printer) including an ink jet head as shown in, for example, FIGURE. The printer 1 shown in FIGURE is an apparatus that prints images and the like on the surface of a print medium 2, such as a printing paper sheet, by ejecting a liquid ink onto the surface of the medium. The printer 1 includes an ink jet head 3, a carriage 4 on which the ink jet head 3 is mounted, a carriage moving mechanism 5 configured to move the carriage 4 in main moving directions (longitudinal directions of the printer 1, or width directions of the print medium 2), and a transport mechanism 6 configured to transport the print medium 2 in a sub moving direction perpendicular to the main moving directions.

The pretreatment liquid and oil-based ink used in the ink jet printing apparatus are stored in an ink cartridge 7. The ink cartridge 7 is removable from the ink jet head 3. In an embodiment, the ink cartridge 7 may be disposed at the body of the printer 1 so that the pretreatment liquid and the ink are fed to the ink jet head 3 from the ink cartridge 7 through an ink feeding tube.

The carriage moving mechanism 5 includes a timing belt 8. The timing belt 8 is driven by a pulse motor 9, such as a DC motor. On actuating the pulse motor 9, the carriage 4 moves reciprocally in the main moving directions along a guide rod 10 extending in the printer 1.

A platen 11 is located below the ink jet head 3 during printing. The platen 11 is disposed away from the surface at which the nozzles are arranged (nozzle plate, not shown) of the ink jet head 3 during printing and supports the print medium 2. The platen 11 has a flushing box 12 at an end thereof in the main moving directions, that is, in a region outside the region (printing region) where the ink is deposited on the print medium 2 on the platen 11. The flushing box 12 is a member into which the pretreatment liquid and the ink are ejected from the ink jet head 3 for preliminary ejection. In the present embodiment, the flushing box 12 is in the form of a box open on the upper side (open toward the ink jet head 3). Also, the flushing box 12 is provided with an ink absorption member (not shown) made of, for example, urethane sponge on the inner bottom surface thereof. Although it is advantageous that the flushing box 12 be disposed at both ends of the platen 11 in the main moving directions, it may be disposed at one end.

The ink jet head 3, which is a device to apply the pretreatment liquid and the oil-based ink onto the print medium 2, includes nozzles (not shown) through which the pretreatment liquid or the oil-based ink is ejected. For ejecting the pretreatment liquid or the oil-based ink, various techniques may be applied. For example, electrostatic suction may be used. In this case, a strong electric field is applied between the nozzles and an acceleration electrode disposed in front of the nozzles so as to eject droplets of a predetermined liquid or an ink continuously through the nozzles, and printing information signals are transmitted between deflection electrodes to control the droplets of a reaction liquid flying between the deflection electrodes. The pretreatment liquid and the oil-based ink may be forcibly ejected as droplets by pressurizing the reaction liquid with a small pump and mechanically vibrating the nozzles with a quartz resonator. A piezoelectric method may be applied. In this case, a pressure and a printing information signal are simultaneously applied to the pretreatment liquid and the oil-based ink with a piezoelectric element to eject droplets of the pretreatment liquid and the ink for printing. Alternatively, a thermal jet method may be applied. In this case, the pretreatment liquid or the oil-based ink is foamed by being heated with a miniature electrode according to printing information signals, thereby ejected for printing.

The ink jet head 3 may be a line head or a serial head. In the present embodiment, a serial ink jet head is used.

The ink jet printing apparatus including a serial ink jet head performs printing by a plurality of number of times of scanning operation (pass) for ejecting ink while moving the printing head relatively to the print medium. For example, the serial ink jet printing head may be mounted on a carriage that moves in a width direction of the print medium (perpendicular to the direction in which the print medium is transported) and ejects droplets while moving accompanying the movement of the carriage.

In the case of using an ink jet printing apparatus including a line head, the ink jet printing apparatus performs printing by a single operation of scanning (pass) for ejecting ink onto the print medium while moving the printing head relatively to the print medium. An example of such a line ink jet printing apparatus may be such that the printing head is wider than the width of the print medium so that droplets can be ejected onto the print medium without moving the head.

The ink jet apparatus may further include a dryer (not shown). The dryer can rapidly evaporate and remove the liquid medium of the pretreatment liquid or the oil-based ink on the printed medium, thus helping rapid formation of a printed image or the like. The dryer may be of any type as long as it has a mechanism to promote evaporation to remove the liquid medium of the pretreatment liquid or the oil-based ink. For example, the dryer may have a device capable of applying heat to the print medium, a device capable of blowing air on the pretreatment liquid or the oil-based ink, or a unit including both of these devices. More specifically, the dryer may be a forcible air heater, a radiation heater, a conductive heater, a high-frequency dryer, or a microwave dryer.

Preferably, the drying with the dryer is performed by heating, and the ink jet printing apparatus ejects liquid onto a heated print medium for printing. Heating may be performed by, but not limited to, a heat press method, a normal-pressure steaming method, a high-pressure steaming method, or a thermal fixing method. For heating the print medium, an infrared lamp may be used. In this instance, the print medium is preferably heated to a temperature in the range of 30° C. to 50° C., more preferably in the range of 30° C. to 40° C. Thus, the ink is more rapidly dried in the printing step.

1-3. 2. Print Medium

In the present embodiment, any print medium may be used without particular limitation, and examples thereof include plain paper, coated paper, plastic films, cloth, and leather. Also, the print medium may be non-absorbent or low-absorbent of ink.

An ink-low-absorbent or ink-non-absorbent print medium mentioned herein refers to a print medium that hardly absorb or does not absorb ink. Quantitatively, the ink-non-absorbent or ink-low-absorbent print medium exhibits a water absorption of 10 mL/m$^2$ or less for a period of 30 ms$^{1/2}$ from the beginning of contact with water, measured by Bristow's method. The Bristow's method is broadly used as a method for measuring liquid absorption for a short time, and Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000). An ink-absorbent print medium refers to that not classified as an ink-non-absorbent or ink-low-absorbent print medium.

The ink-non-absorbent print medium may be a plastic film not provided with an ink-absorbing layer, or a paper sheet or any other base material coated with or bonded to a plastic film. The plastic mentioned here may be polyvinyl chloride, polyethylene terephthalate, polycarbonate, polystyrene, polyurethane, polyethylene, or polypropylene.

The ink-low-absorbent print medium may be provided with a coating layer capable of receiving ink on the surface thereof. The ink-low-absorbent print medium having a paper base may be a book-printing paper, such as art paper, coated paper, or matte paper, and that having a plastic base may be a film of polyvinyl chloride, polyethylene terephthalate, polycarbonate, polystyrene, polyurethane, polyethylene, polypropylene, or the like coated with a hydrophilic polymer or a coating formed by applying silica or titanium particles together with a binder. The print medium may be transparent.

1-3. 3. Pretreatment

In the present embodiment, pretreatment is the operation of applying the pretreatment liquid according to an embodiment of the invention to a print medium by ejecting droplets of the pretreatment liquid onto the print medium from an ink jet head. The pretreatment liquid may be applied as described above by for example, immersing the print medium in the pretreatment liquid, using a roll coater or the like, or ejecting the pretreatment liquid. For ejecting the pretreatment liquid, an ejection apparatus using a spraying method or an ink jet method may be used. In the present embodiment, the pretreatment liquid is applied by ejecting droplets of the pretreatment liquid onto the print medium 2 from an ink jet head 3.

The amount of the pretreatment liquid applied is preferably in the range of 0.1 mg/cm$^2$ to 30.0 mg/cm$^2$, more preferably in the range of 0.4 mg/cm$^2$ to 10 mg/cm$^2$. When the pretreatment liquid is applied in such a range, the resulting printed matter is favorably stored in a clear folder. In addition, the pretreatment liquid can be dried in a short time, and thus printing speed can be increased.

The method may include drying the applied pretreatment liquid before applying the oil-based ink. This drying step may be stopped in a state where the pretreatment liquid is still wet. The pretreatment liquid may be naturally dried, or may be heated for drying from the viewpoint of increasing drying speed and helping the resin in the pretreatment liquid to fuse with the print medium. If the pretreatment liquid is dried by heating, the heating may be performed by, but not limited to, a heat press method, a normal-pressure steaming method, a high-pressure steaming method, or a thermal fixing method. The heat source for this heating may be, but is not limited to, infrared rays (lamp).

1-3. 4. Application of Oil-Based Ink (Printing)

Subsequently, the oil-based ink is applied onto the surface of the print medium pretreated with the pretreatment liquid to print an image. Thus, the image of the oil-based ink is formed on the surface of the print medium.

The term "image" mentioned herein refers to a printed pattern defined by dots, including a printed character and a solid pattern. A solid pattern mentioned herein refers to a pattern defined by only pixels filled with printed dots in such a manner that the printing region of the print medium is covered with an ink so that the surface of the print medium is not visible, and the pixel refers to the minimum unit of a printing area, defining a printing resolution.

The maximum amount of the oil-based ink applied to the surface of the print medium is preferably in the range of 5 mg/inch$^2$ to 15 mg/inch$^2$. When the maximum amount of the oil-based ink applied to the surface of the print medium is in this range, the printed matter can be more favorably stored in a clear folder, and printing speed is increased.

After printing, the oil-based ink deposited on the print medium may be dried in a drying step. In this instance, it is advantageous to dry the oil-based ink to the extent that the solid pattern does not have a sticky feel. Although the oil-based ink may be dried by natural drying, it is advantageous to dry the oil-based ink by heating from the same viewpoint as in the step of drying the pretreatment liquid. The heating of the oil-based ink may be performed by, but not limited to, any of the above-mentioned heating methods.

In the oil-based ink jet printing method of the present embodiment, the print medium is pretreated with the pretreatment liquid before printing with the oil-based ink. This pretreatment reduces the deformation of the clear folder caused by the adverse effect of the organic solvent in the printed image. Also, the clear folder is kept from being deformed by printed matter created with the oil-based ink for a long time.

1-4. Examples

The subject matter of the invention will now be further described in detail with reference to Examples and Comparative Examples. However, the invention is not limited to the Examples.

1-4. 1. Preparation of Pretreatment Liquid

Each of pretreatment liquids 1 to 3 was prepared by mixing the materials and stirring the mixture according to the composition (in terms of percent by mass) shown in Table 1.

TABLE 1

|  | Pretreatment liquid 1 | Pretreatment liquid 2 | Pretreatment liquid 3 |
|---|---|---|---|
| Rosin-modified maleic anhydride resin 1 | 10 | 0 | 0 |
| Rosin-modified maleic anhydride resin 2 | 0 | 10 | 0 |
| Styrene-modified maleic anhydride resin | 0 | 0 | 10 |
| Tetrahydrofuran | 90 | 90 | 90 |

In Table 1, rosin-modified maleic anhydride resin 1 was MALKYD No. 32 (produced by Arakawa Chemical Industries); rosin-modified maleic anhydride rein 2, MALKYD No. 33 (produced by Arakawa Chemical Industries); and styrene-modified maleic anhydride resin, ARASTAR 700 (produced by Arakawa Chemical Industries).

1-4. 2. Preparation of Oil-Based Ink Composition

Materials were mixed according to the composition (in terms of percent by mass) shown in Table 2 and were completely dissolved by stirring. The resulting solution was filtered through a membrane filter of 1 μm in pore size to yield an oil-based ink composition.

TABLE 2

|  | Ink 1 | Ink 2 | Ink 3 | Ink 4 | Ink 5 |
|---|---|---|---|---|---|
| 1-Dodecanol | 99 | 0 | 0 | 0 | 0 |
| Hexadecanol | 0 | 99 | 0 | 0 | 0 |
| Oleyl alcohol | 0 | 0 | 99 | 0 | 0 |
| 2-Ethylhexanol | 0 | 0 | 0 | 99 | 0 |
| Hexadecane | 0 | 0 | 0 | 0 | 99 |
| Oil-based dye 1 | 1 | 1 | 1 | 1 | 1 |

In Table 2, the oil-based dye was Neozapon Blue 807 (produced by BASF).

1-4. 3. Clear Folder Modification Test

The pretreatment liquid was applied to Monochrome Copy/Printer Paper P (manufactured by Fuji Xerox) with a bar coater (wire number: No. 2), followed by air-drying for 12 hours. Next, each of the oil-based ink compositions was introduced into an ink cartridge of an ink jet printer PX-M 7050F (manufactured by Seiko Epson) modified for the test, and a solid pattern in a 20 cm×28 cm rectangular shape was printed with the ink on a sheet of double-sided high-quality plain paper (manufactured by Seiko Epson). The printed sheet was put into a PP clear folder. The clear folder holding the printed sheet was allowed to stand in a laid position in an environment of 23° C. in temperature and 50% in relative humidity for 30 days. Then, the degree of the outward warp of the clear folder was measured with a ruler, and the measured value was evaluated as the degree of deformation. The results were rated as follows:

5: Deformation degree of less than 10 mm
4: Deformation degree in the range of 10 mm to less than 30 mm
3: Deformation degree in the range of 30 mm to less than 50 mm
2: Deformation degree in the range of 50 mm to less than 100 mm
1: Deformation degree of 100 mm or more

TABLE 3

|  | Example 1 | Example 2 | Example 3 | Example 4 |
|---|---|---|---|---|
| Pretreatment liquid | Pretreatment liquid 1 | Pretreatment liquid 2 | Pretreatment liquid 3 | Pretreatment liquid 1 |
| Ink | Ink 1 | Ink 1 | Ink 1 | Ink 2 |
| Clear folder storage | 4 | 4 | 3 | 5 |

|  | Example 5 | Example 6 | Comparative Example 1 | Comparative Example 2 |
|---|---|---|---|---|
| Pretreatment liquid | Pretreatment liquid 1 | Pretreatment liquid 2 | — | Pretreatment liquid 1 |
| Ink | Ink 3 | Ink 4 | Ink 1 | Ink 5 |
| Clear folder storage | 5 | 2 | 1 | 1 |

1-4. 4. Evaluation Results

Evaluation results are shown in the bottom row of Table 3. Comparative Example 1, in which the pretreatment liquid was not used, resulted in a large deformation degree of the clear folder, thus inferior in clear folder storage. Comparative Example 2, in which the pretreatment liquid was used while the organic solvent used was outside the scope of the invention, resulted in a large deformation degree of the clear folder, thus inferior in clear folder storage. On the other hand, the Examples, which used a combination of a pretreatment liquid and an oil-based ink containing an organic solvent containing at least one selected from the group consisting of alcohols, primary amines, exhibited smaller deformation of the clear folder than in Comparative Examples 1 and 2, thus superior in storage.

In the present embodiment of the invention, as described above, the oil-based ink used in the present embodiment contains at least one organic compound selected from the group consisting of alcohols, primary amines, and secondary amines as the organic solvent, and the pretreatment liquid contains a maleic anhydride resin derivative. This considerably suppresses the deformation of the clear folder and enables the clear folder to be kept for a long time from being deformed by printed matter created with the oil-based ink.

Another embodiment of the invention will now be described. The following embodiment will be described by way of example. The invention is not limited to the following embodiment, and various modifications may be made within the scope and spirit of the invention.

2-1. Pretreatment Liquid

In the present embodiment, a pretreatment liquid is provided for an oil-based ink, and the pretreatment liquid contains an aluminum chelate compound.

The pretreatment liquid of the present embodiment is one of the elements of an oil-based ink jet printing ink set used in an oil-based ink jet printing method. The presence of the aluminum chelate compound in the pretreatment liquid enables printed matter to be favorably stored in a clear folder for a long time.

The ingredients in the pretreatment liquid of the present embodiment will now be described.

2-1. 1. Aluminum Chelate Compound

The pretreatment liquid of the present embodiment contains an aluminum chelate compound. If a pretreatment liquid contains an aluminum chelate compound, an exchange reaction occurs between the aluminum chelate compound and the organic solvent in the oil-based ink that can attack the clear folder, thereby converting the solvent into a solvent having a reduced attack power. Consequently, the presence of the aluminum chelate compound in the pretreatment liquid enables the resulting printed article to be favorably stored in a clear folder for a long time.

The aluminum chelate compound may be represented by the following general formula (1) or (2):

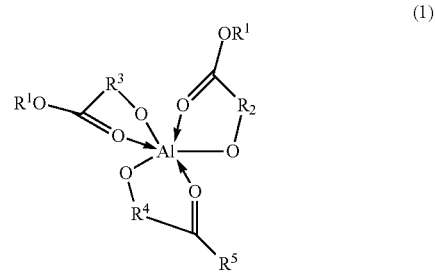

(1)

wherein $R^1O$ represents a volatile alkoxy group, $R^2$, $R^3$, and $R^4$ each represent an alkyl group, and $R^5$ represents a methyl group or $R^1O$; and

(2)

wherein $R^6O$ represents a volatile alkoxy group, and $R^7$ represents an alkyl group.

In the compounds presented by formulas (1) and (2), the volatile alkoxy groups represented by $R^1O$ and $R^6O$ may have any carbon number without particular limitation. Preferably, it is in the range of 1 to 5, more preferably 2 or 3.

Also, the alkyl groups represented by $R^2$, $R^3$, and $R^4$ may have any carbon number without particular limitation. Preferably, it is in the range of 1 to 5, more preferably 2 or 3.

For example, the compound of formula (1) may be the compound represented by the following formula (3):

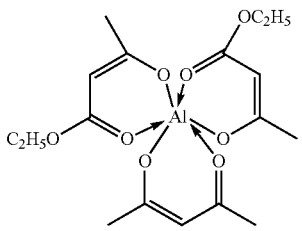

(3)

For example, the compound of formula (2) may be the compound represented by the following formula (4):

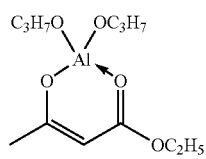

(4)

The aluminum chelate compound content is in the range of 1% to 20% by mass, preferably 1% to 16% by mass, and more preferably 3% to 16% by mass, relative to the total mass (100% by mass) of the pretreatment liquid. When the aluminum chelate compound content is in such a range, the pretreatment liquid can be easily applied and can improve clear folder storage effectively.

Chelate compounds other than aluminum chelate compounds, for example, those of Group 13 elements, such as B (boron), Ga (gallium), and In (indium), can produce the same effect. However, aluminum chelate compounds are most efficient and advantageous in terms of cost and safety.

2-1. 2. Liquid Medium

The pretreatment liquid of the present embodiment contains a liquid medium in which the aluminum chelate compound is dispersed. The liquid medium may be an aqueous solvent or an organic solvent. Aqueous solvent, in general, contains water, and the aqueous solvent used in the pretreatment liquid of the present embodiment may be a water-soluble organic solvent. The organic solvent may be a known vegetable oil and/or petroleum solvent, and also may be a polar organic solvent or a nonpolar organic solvent.

The liquid medium content can be appropriately determined without particular limitation and may be in the range of 70% to 95% by mass relative to the total mass (100% by mass) of the pretreatment liquid.

2-1. 3. Other Ingredients

The pretreatment liquid of the present embodiment may further contain other additives that are generally contained in ordinary pretreatment liquids. Such additives include, but are not limited to, a flocculant, a resin, a surfactant, a pH adjuster, a preservative, a fungicide, and a thickener.

Flocculant

The flocculant has the function of reacting with the coloring material or the resin in the oil-based ink and thereby forming an aggregate of these ingredients of the ink. Thus, the flocculant improves the quality of the image formed with the oil-based ink and suppresses bleeding and, in addition, improves clear folder storage.

Examples of the flocculant include, but are not limited to, organic acids, such as acetic acid, propionic acid, and lactic acid, and salts thereof, polyallylamines, polyallylamine derivatives, and polyvalent metal compounds. Polyvalent metal compounds and organic acids are advantageous from the viewpoint of forming an aggregate of the coloring material, and polyvalent metal compounds are particularly advantageous. If a polyvalent metal compound is used, the content of the metal ion of the polyvalent metal compound in the pretreatment liquid, that is, the content of the metal ion derived from the polyvalent metal compound, is preferably in the range of 0.5% to 5% by mass, more preferably 1% to 5% by mass, relative to the total mass (100% by mass) of the pretreatment liquid.

Resin

The pretreatment liquid of the present embodiment may contain a resin. By adding a resin, the fixability of the pretreatment liquid to the print medium can be increased. When the resin is added, the resin is preferably in the form of an emulsion. Resin emulsion can keep the viscosity of the pretreatment liquid from increasing compared with a resin solution, when the solids contents of the emulsion and the solution are the same.

Examples of the resin include known resins, such as acrylic resins, styrene acrylic resins, fluorene-based resins, urethane-based resins, polyolefin-based resins, rosin-modified resins, terpene-based resins, polyester-based resin, polyamide-based resins, epoxy resins, vinyl chloride-based resins, vinyl chloride-vinyl acetate copolymers, ethylene vinyl acetate resins, and maleic anhydride resin derivatives; and polyolefin waxes. These resins may be used singly or in combination.

Among these resins, preferred are styrene acrylic resins, polyester-based resins, polyolefin waxes, and maleic anhydride resin derivatives.

If the pretreatment liquid contains such a resin, the resin content is preferably in the range of 1% to 20% by mass, more preferably 1% to 16% by mass, and still more preferably 3% to 16% by mass, relative to the total mass of the pretreatment liquid. When the resin content is in such a range, the fastness to rubbing of the resulting image is increased.

Surfactant

The surfactant may be an acetylene glycol-based surfactant, a silicone surfactant, or a fluorosurfactant.

Examples of the acetylene glycol-based surfactant include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each product name, produced by Air Products and Chemicals. Inc.); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each product name, produced by Nissin Chemical Industry); and ACETYLENOL series E00, E00P, E40, and E100 (each product name, produced by Kawaken Fine Chemicals).

Examples of the silicone surfactant include, but are not limited to, polysiloxane-based compounds. For example, a polyether-modified organosiloxane may be used as the polysiloxane-based compound. Polyether-modified organosiloxanes are available from the market, such as BYK-306, BYK-307, BYK-333, BYK-341, BYK-345, BYK-346, and BYK-348 (each product name, produced by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each product name, produced by Shin-Etsu Chemical).

The fluorosurfactant may be a fluorine-modified polymer, such as BYK-340 (produced by BYK Japan KK).

If the pretreatment liquid contains a surfactant, the content thereof may be in the range of 0.05% to 2.0% by mass relative to the total mass of the pretreatment liquid.

pH Adjuster

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Preservative, Fungicide, and Rust Preventive

Examples of the preservative or fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives or fungicides include Proxel XL2 and Proxel GXL (each product name, produced by Avecia), and Denicide CSA and NS-500W (each product name, produced by Nagase Chemtex). Benzotriazole or the like may be used as a rust preventive.

Thickener

Examples of the thickener include polyvinyl alcohols, poly(meth)acrylic acids, polyethers, polyvinyl pyrrolidones, polyvinyl formals, protein, such as gelatin, casein, and glue, polysaccharide, such as pullulan, dextran, dextrin, cyclodextrin, carrageenan, pectin, glucomannan, sodium alginate, xanthan gum, Arabic gum, locust bean gum, tragacanth gum, guar gum, and tamarind gum, starches, such as starch, oxidized starches, carboxy starches, and dialdehyde starches, cellulose and derivatives thereof, such as methyl cellulose, ethyl cellulose, carboxymethyl cellulose, hydroxyethyl cellulose, hydroxypropyl cellulose, and (hydroxypropyl)methyl cellulose, alginic acid salts, such as sodium alginate, potassium alginate, and ammonium alginate, and alginic acid esters, such as propylene glycol alginate. If the pretreatment liquid contains a thickener, the content thereof may be, but is not limited to, 20% by mass or less relative to the total mass of the pretreatment liquid.

2-1. 4. Preparation of Pretreatment Liquid

The pretreatment liquid of the present embodiment may be prepared by mixing the above-described ingredients (materials) in an arbitrary order and optionally removing impurities by, for example, filtration. For mixing the materials, the materials may be added one after another into a container equipped with a stirrer, such as a mechanical stirrer or a magnetic stirrer, and mixed together by stirring. For filtration, a centrifugal filter, a membrane filer, or any other filter may be used.

2-1. 5. Physical Properties of Pretreatment Liquid

The pretreatment liquid of the present embodiment preferably has a viscosity of 30 mPa·s or less, more preferably 25 mPa·s or less, still more preferably 20 mPa·s or less, still more preferably 15 mPa·s or less, still more preferably 10 mPa·s or less, or still more preferably 5 mPa·s or less, at 20° C. from the viewpoint of being reliably ejected through nozzles by an ink jet method or a spray method, or being easily applied with a roll coater or the like. The lower limit of the viscosity is preferably, but is not limited to, 1 mPa·s. The viscosity can be measured at 20° C. with a viscoelasticity meter MCR-300 (product name, manufactured by Anton Paar Japan K.K.).

2-1. 6. Use

The pretreatment liquid of the present embodiment is applied onto a print medium, such as a paper sheet, by painting, jetting, or spraying before printing with a known ink jet printing apparatus. Consequently, in the step of printing, an alcohol exchange reaction with the aluminum chelate compound occurs rapidly in the ink on the surface of the print medium, thereby preventing the ingredients of the oil-based ink from attacking the clear folder.

The pretreatment liquid may be applied by any technique. For example, the print medium may be immersed in the pretreatment liquid or painted with the pretreatment liquid by using a roll coater or the like, or the pretreatment liquid may be ejected. For ejecting the pretreatment liquid, an ejection apparatus of, for example, a spray type or an ink jet type may be used. In this instance, the ejection apparatus ejects the pretreatment liquid in a state not in contact with the print medium.

2-2. Oil-Based Ink

The oil-based ink used in the present embodiment is combined with the above-described pretreatment liquid to constitute an oil-based ink jet printing ink set. The oil-based ink jet printing ink set disclosed herein includes the above-described pretreatment liquid, and at least one color ink composition (for example, white, cyan, magenta, yellow, or black ink composition) as the oil-based ink. The oil-based ink may be a clear ink not containing a coloring material.

The oil-based ink used in the present embodiment contains an organic solvent. In the present embodiment, the oil-based ink may be used as an artists' oil paint, a paint, a writing ink such as that for a fountain pen, or a printing ink without particular limitation.

The term "oil-based ink" used herein refers to an ink containing mainly an organic solvent and substantially free from water. The phrase "substantially free from water" mentioned herein means that the ink is prepared without intentionally adding water and implies that a trace amount of water unavoidably added during preparation or storage may be contained.

The water content in the "oil-based ink substantially free from water" is preferably 3% by mass or less, more preferably 1% by mass or less, and still more preferably less than 0.05% by mass, still more preferably less than 0.01% by mass, still more preferably less than 0.005% by mass, or still more preferably less than 0.001% by mass.

In the present embodiment, a case where the oil-based ink is used as an oil-based ink jet printing ink composition will be described by way of example, and essential ingredients and optionally added ingredients of the oil-based ink jet ink composition will be described.

2-2. 1. Coloring Material

The oil-based ink used in the present embodiment contains a coloring material. The coloring material may be an oil-based dye, inorganic color pigment or organic color pigment conventionally used in oil-based ink jet ink compositions. These coloring materials may be used singly or in combination.

If a pigment is used, the average particle size of the pigment in the dispersion of the ink is in the range of 20 nm to 200 nm, and any known inorganic or organic pigment may be used without particular limitation as long as the hue thereof is white, black, yellow, magenta, cyan, red, green, blue, or orange.

Examples of the pigment include azo pigments, such as azo lake, insoluble azo pigments, condensed azo pigments, and chelate azo pigments; polycyclic pigments, such as phthalocyanine pigments, perylene and perylene pigments, anthraquinone pigments, quinacridone pigments, dioxazine pigments, thioindigo pigments, isoindolinone pigments, and quinophthalone pigments; dye lakes, such as basic dye lakes and acid dye lakes; other organic pigments, such as nitro pigments, nitroso pigments, aniline black, and daylight fluorescent pigments; and inorganic pigments, such as carbon black.

More specifically, examples of the pigment for a magenta or red ink as the oil-based ink jet ink composition of the present embodiment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, C.I. Pigment Red 224, and C.I. Pigment Violet 19.

When the oil-based ink of the present embodiment is an orange or a yellow ink, examples of the pigment include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

When the oil-based ink is a green or a cyan ink, examples of the pigment include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and C.I. Pigment Green 36.

When the oil-based ink is a black ink, the pigment may be carbon black.

For an oil-based white ink, examples of the pigment include C.I. Pigment White 6, C.I. Pigment White 18, and C.I. Pigment White 21.

The pigment is commercially available. Suitable commercially available black pigments include Mitsubishi Chemical carbon blacks MA11, MA100, MA220, MA600a, #40, and #44. Pigments for other colors include SYMULER Brilliant Carmine 6B, SYMULER Red, FASTOGEN Super Magenta, SYMULER Fast Yellow, FASTOGEN Blue 4RO-2, FASTOGEN Green, and FASTOGEN Super Violet, each produced by DIC. These pigments may be used singly or in combination.

The pigment content in the oil-based ink used in the present embodiment is appropriately determined according to the use or printing properties, and is preferably in the range of 0.01% to 20% by mass, more preferably 0.5% to 15% by mass, and still more preferably 1% to 10% by mass, relative to the total mass (100% by mass) of the ink from the viewpoint of obtaining a good hiding property and good color reproduction.

Preferably, the pigment has an average particle size in the range of 20 nm to 200 nm, as mentioned above. Such a pigment improves color developability, and accordingly, the oil-based ink is suitable as an ink jet ink. Also, a pigment having an average particle size of 200 nm or less is suitable for using in an ink jet technique. More preferably, the average particle size is in the range of 50 nm to 150 nm. The oil-based ink containing such a pigment is superior in storage stability, ejection stability, and sedimentation when used as an ink jet ink.

The average particle size mentioned herein refers to a sphere-equivalent 50% average particle size (d50) in an ink measured by a light scattering method. The sphere-equivalent 50% average particle size (d50) can be obtained as below. Diffracted/scattered light generated by irradiating particles in a dispersion medium with light is measured with detectors disposed in front, side and back of the dispersion medium. With the assumption that particles, which are naturally indefinite in shape, are spherical, a cumulative curve is obtained from the measurement results with respect to the total volume (100%) of the spherical particles calculated from the volumes of measured particles, and the point where the cumulative value is 50% is defined as the sphere-equivalent 50% average particle size (d50).

If a pigment is used as the coloring material, a dispersant selected from the known dispersants used in ordinary oil-based inks may be used for stably dispersing the pigment in the oil-based ink. In the present embodiment, any pigment dispersant may be used as long as it can stably disperse the pigment in a dispersion medium, and examples of the dispersant include Solsperse 5000, Solsperse 13940, Solsperse 11200, Solsperse 21000, and Solsperse 28000, each produced by Lubrizol.

The dispersant content in the oil-based ink used in the present embodiment may be appropriately determined according to the pigment to be dispersed, and is preferably in the range of 5 parts by mass to 200 parts by mass, more preferably 30 parts by mass to 120 parts by mass, relative to 100 parts by mass of the pigment in the oil-based ink.

If the oil-based ink contains a dye, the dye is commercially available, and preferred examples thereof include black dyes produced by Orient Chemical Industries, such as VALIFAST BLACK 3810, elixa Black 846, OIL BLACK HBB, and OIL BLACK No. 5, and other color dyes, such as OIL BLUE 2N, elixa Orange-240, VALIFAST BLUE 1603, elixa Green-502, VALIFAST ORANGE 1201, OIL GREEN 530, elixa Green-540, OIL YELLOW GG-S, elixa Yellow-129, and VALIFAST YELLOW 1101. These dyes may be used singly or in combination.

2-2. 2. Organic Solvent

The oil-based ink used in the present embodiment contains an organic solvent. The term "organic solvent" used herein refers to an organic solvent that is liquid at room temperature under normal pressure and is a constituent of the liquid medium in which the coloring material, such as a pigment, is dispersed. If the liquid medium is a mixture of an organic solvent and any other substance, the liquid medium contains more than 5% by mass of organic solvent.

In the oil-based ink used in the present embodiment, the organic solvent may be an alcohol. Since alcohols have high polarity, the use of an alcohol can suppress the deformation of the clear folder. Also, in combined use of an alcohol with the above-described pretreatment liquid, printed matter can be more favorably stored in a clear folder.

Examples of the alcohol used as the organic solvent include, but are not limited to, primary to tertiary alcohols and monohydric to trihydric alcohols. The hydrocarbon group of the alcohol may be saturated or unsaturated, or may be linear or branched. Similarly, the hydrocarbon group of the primary amine or the secondary amine used as the organic solvent may have any structure, as long as the organic solvent has a high polarity and can suppress the deformation of the clear folder.

Preferably, the alcohol has a higher alcohol having a carbon number of 12 or more. Such an alcohol has a higher polarity and can suppress the deformation of the clear folder. Examples of the higher alcohol having a carbon number of 12 or more include 1-dodecanol, hexadecanol, and oleyl alcohol. These organic solvents may be used singly or in combination.

The organic solvent content in the oil-based ink is preferably 80% by mass or more, more preferably 90% by mass or more, relative to the total mass (100% by mass) of the ink composition.

2-2. 3. Other Ingredients

The oil-based ink used in the present embodiment may further contain other additives that are generally contained in ordinary oil-based inks. Examples of such an additive include an organic solvent other than the organic solvent described above, a stabilizer, such as an antioxidant or an ultraviolet absorbent, a binder resin, a metal soap, and a metal complex.

Other Organic Solvents

The organic solvent other than the above-described organic solvent may be polar or nonpolar, and examples thereof include esters of a drying oil fatty acid and an alcohol, organic solvents having a high solubility parameter (SP) value and high iodine value, and drying oil.

Exemplary nonpolar organic solvents include hydrocarbon solvents, such as naphthene, paraffin, and isoparaffin, fluorocarbon solvents, and silicone solvents. Some of these nonpolar organic solvents are commercially available, and examples thereof include dodecane and other saturated aliphatic hydrocarbons; ISOPAR and Exxsol, each produced by Exxon Mobil; AF Solvent and Normal Paraffin H, each produced by JX Nippon Oil & Energy; AS sol produced by WILLVE; Dust Clean series produced by Matsumura Oil; SUNTHENE series and SUNPAR series, each produced by Japan Sun Oil Company; and Surflon series produced by AGC Seimi Chemical.

Exemplary polar organic solvents include ester-based solvents, alcohol-based solvents, amide-based solvents, fatty acid-based solvents, and ether-based solvents.

For example, the ester-based solvent may be a higher fatty acid ester having a carbon number of 5 or more, preferably 9 or more, more preferably 12 to 32, and examples thereof include isodecyl isononanoate, isotridecyl isononanoate, isononyl isononanoate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, diisopropyl adipate, diisopropyl sebacate, diethyl sebacate, propylene glycol monocaprylate, trimethylolpropane tri-2-ethylhexanoate, and glyceryl tri(2-ethylhexanoate). Furthermore, ester-based solvents include esters of a drying oil fatty acid and an alcohol, such as soybean oil fatty acid methyl ester, soybean oil fatty acid isobutyl ester, linseed oil fatty acid methyl ester, linseed oil fatty acid butyl ester, linseed oil fatty acid propyl ester, linseed oil fatty acid 2-ethylhexyl ester, tung oil fatty acid methyl ester, tall oil fatty acid methyl ester, and tall oil fatty acid isobutyl ester.

The alcohol-based solvent may be a higher aliphatic alcohol having a carbon number of 12 or more, and examples thereof include isomyristyl alcohol, isopalmityl alcohol, isostearyl alcohol, and oleyl alcohol.

Examples of amide-based solvents include acetamide, dimethylacetamide, and N-methylpyrrolidinone.

The fatty acid-based solvent may be a fatty acid having a carbon number of 4 or more, preferably 9 to 22, and examples thereof include isononanoic acid, isomyristic acid, hexadecanoic acid, isopalmitic acid, oleic acid, and isostearic acid.

Examples of ether-based solvents include glycol ethers, such as diethylene glycol monobutyl ether, ethylene glycol monobutyl ether, propylene glycol monobutyl ether, and propylene glycol dibutyl ether; and glycol ether acetates.

Esters of a drying oil fatty acid and an alcohol have low viscosities. Even if a large amount of such an ester is used in an ink jet printing ink, it does not affect the ejection of the ink. Also, such esters do not attack polypropylene (PP), which is the material of the clear folder, and those having many double bonds help the oxidative polymerization of the ink. Therefore, by adding an ester of a drying oil fatty acid and an alcohol to the ink used in the present embodiment, the ink can have a low viscosity before being printed, while after being printed, the ink is rapidly hardened to have a high viscosity, thus fixing the organic solvent therein in the resulting printed matter. Accordingly, the organic solvent is kept from migrating from the printed matter to the clear folder even if the printed matter is held in a clear folder. Thus, the printed matter can be stably stored in the clear folder.

The drying oil fatty acid that is a constituent of the above ester is produced from a drying oil by hydrolysis. Examples of the drying oil include linseed oil, tung oil, mustard oil, perilla oil, walnut oil, safflower oil, and sunflower oil. Hydrolysis of the drying oil can be performed by a known method.

The alcohol that is a constituent of the above ester may be unsaturated and the carbon number thereof is not limited. However, since the ester hydrolyzes on the print medium immediately after printing and the alcohol produced by the hydrolysis can migrate to the clear folder, the composition of the ink should be determined according to the carbon number of the alcohol.

In the case where the alcohol has a carbon number of 3 or less, even if the alcohol migrates from the print medium to the clear folder and deforms the clear folder, the clear folder tends to recover because of the volatility of the alcohol, while the ester of the alcohol severely attacks PP. It is therefore desirable to complete the oxidative polymerization of the ink before the organic solvent migrates to the clear folder and thus to prevent the alcohol produced by the hydrolysis from migrating to the clear folder. It is desirable to use a metal soap or a metal complex together to promote hardening.

In the case where the alcohol has a carbon number of 4 or more, while the alcohol does not severely attack PP, the alcohol produced by hydrolysis is likely to migrate to the clear folder and thus to deform the clear folder because of the low volatility of the alcohol. In this instance, if the ink contains a metal soap or a metal complex, the hydrolysis of the ester is promoted. It is desirable that the ink do not contain a metal soap or a metal complex.

The ester of a drying oil fatty acid and an alcohol can be produced by a known method without particular limitation, and, for example, any one of the methods disclosed in JP-A-2005-53871, JP-A-2009-203343, and JP-A-2011-99009 may be applied.

The term SP value refers to the solubility parameter and can be calculated by using Fedors's calculation described in Research on Coatings No. 152 (2010) P. 43. The iodine value is a value calculated by, for example, the method specified in JIS K 3331: 2009, Hardened oils and fatty acids for industrial use.

The above-cited organic solvents have high SP values and accordingly do not severely attack PP, and also promote the oxidative polymerization of the ink because of the presence of many double bonds in the molecule thereof. Therefore, by adding any of those organic solvents to the ink of the present embodiment, the ink is rapidly hardened after being printed, thus fixing the organic solvent in the ink in the print medium. Accordingly, the organic solvent is kept from migrating from the printed matter to the clear folder even if the printed matter is held in a clear folder. Thus, the printed matter can be stably stored in the clear folder.

Examples of such an organic solvent include linolenic acid monoglyceride (SP value: 10.3, iodine value: 216), the above-described esters of a drying oil fatty acid and an alcohol, compounds represented by general formula (2) described later (SP value: 12.6, iodine value: 297), and compounds represented by general formula (3) (SP value: 11.5, iodine value: 231). These organic solvents may be used singly or in combination.

The organic solvent having a high SP value and a high iodine value may contain an allyl compound. α-Carbons of allyl compounds are likely to cause crosslinking reaction. Accordingly, when the ink contains an allyl compound as an organic solvent, the oxidative polymerization of the ink is promoted. Therefore, by using an allyl compound in the ink used in the present embodiment, the ink can have a low viscosity before being printed, while after being printed, the ink is rapidly hardened to have a high viscosity, thus fixing the organic solvent therein in the print medium. Accordingly, the organic solvent is kept from migrating from the printed matter to the clear folder even if the printed matter is held in a clear folder. Thus, the printed matter can be stably stored in the clear folder.

The allyl compound is preferably, but is not limited to, a reactive compound that does not severely attack PP. Allyl ethers are particularly advantageous from the viewpoint of reactivity.

Drying oils are viscous and, accordingly, an ink jet printing ink containing a large amount of drying oil has a problem in ejection. However, drying oils do not attack polypropylene (PP), which is the material of the clear folder, and those having many double bonds help the oxidative polymerization of the ink. Therefore, auxiliary use of a drying oil in the ink of the present embodiment helps the ink harden rapidly after printing and, thus, the organic solvent in the ink is fixed in the print medium. Accordingly, the organic solvent is kept from migrating from the printed matter to the clear folder even if the printed matter is held in a clear folder. Thus, the printed matter can be stably stored in the clear folder.

The drying oil used herein refers to an oil that can harden completely in air and has an iodine value of 130 or more, and examples thereof include linseed oil, tung oil, mustard oil, perilla oil, walnut oil, safflower oil, and sunflower oil. These drying oils may be used singly or in combination.

If a drying oil is added, its content is preferably in the range of 0.05% to 10% by mass relative to the total mass of the oil-based ink from the viewpoint of stable ejection of the ink.

Antioxidant

Examples of the antioxidant include BHA (2,3-butyl-4-oxyanisole) and BHT (2,6-di-t-butyl-p-cresol).

Ultraviolet Absorbent

Examples of the ultraviolet absorbent include benzophenone-based compounds and benzotriazole-based compounds.

Binder Resin

The oil-based ink used in the present embodiment may contain a binder resin to control the viscosity thereof. Examples of the binder resin include acrylic resins, styrene acrylic resins, rosin-modified resins, phenol resins, terpene resins, polyester resins, polyamide resins, epoxy resins, vinyl chloride-vinyl acetate copolymer resins, cellulose acetate butyrate and other textile fabric resins, and vinyl toluene-α-methylstyrene copolymer resins. These binder resins may be used singly or in combination. The fixability of the ink to vinyl chloride-based resin can be further enhanced by varying the binder resin content in the ink.

Metal Soap or Metal Complex

Metal soaps and metal complexes, which are often called a dryer (hardening accelerator), can act as an oxidizing agent to help the oxidative polymerization of the organic compound in the above-described organic solvent. Therefore, when the oil-based ink is used for printing on a print medium, such as a paper sheet, the ink is rapidly hardened after being printed, thus fixing the organic solvent therein in the print medium. Accordingly, the organic solvent is kept from migrating from the printed matter to the clear folder even if the printed matter is held in a clear folder. Thus, the clear folder is prevented from being deformed.

In the present embodiment, the metal of the metal soap or metal complex may be at least one selected from the group consisting of Co (cobalt), Mn (manganese), Pb (lead), Zr (zirconium), Ca (calcium), Ba (barium), K (potassium), and Fe (iron). In the present embodiment, the metal soap or metal complex is a metal salt of an organic acid. Any of the organic acids generally used as the material of the dryer may be used as the raw material of the organic acid metal salt without particular limitation. More specifically, the organic acid may be selected from among propionic acid, octylic acid, naphthenic acid, neodecanoic acid, tung oil acid, linseed oil acid, soybean oil acid, and resin acid. From the viewpoint of producing good effect in promoting drying, aliphatic monocarboxylic acids having a carbon number of 3 to 12 are advantageous, and octylic acid, naphthenic acid, and neodecanoic acid are more advantageous. These organic acids may be used singly or in combination.

Cobalt salts of those compounds (metal salts) containing any of the above-cited metals help oxidation at the interface between the coating film of the ink and air, while salts of the other metals, such as manganese salts, act for surface oxidation and also on the inside of the coating film, thus helping the polymerization of the entire ink. Auxiliary dryers such as zirconium salts and calcium salts can improve the total characteristics of the ink when used in combination with the above-described dryer, but are hardly effective when used singly.

The organic acid metal salt used in the present embodiment may be represented by general formula (A): $(OMR)_3$. In formula (A), M represents a cobalt atom or a manganese atom; R represents an organic acid group, and the three R's may be the same or different.

More specifically, the organic acid group R is an acyl group of an organic acid, such as propionic acid, octylic acid, naphthenic acid, neodecanoic acid, tung oil acid, linseed oil acid, soybean oil acid, and resin acid, and is preferably an acyl group of an aliphatic monocarboxylic acid having a carbon number of 3 to 12, more preferably an acyl group of octylic acid, naphthenic acid, or neodecanoic acid.

Although a cobalt or manganese dryer is used as the metal soap or metal complex in the present embodiment as described above, a manganese dryer is advantageous in view of the environment where it is used. Manganese is however less active to cobalt. If a manganese dryer is used, it is advantageous to use the manganese dryer together with a ligand capable of activating the manganese dryer. The compound acting as the ligand may be 2,2'-bipyridine, 2-(aminomethyl)pyridine, or 2-(hydroxymethyl)pyridine. These ligand compounds may be used singly or in combination.

A preferred manganese dryer is manganese neodecanoate and is also commercially available as, for example, DIC-NATE Mn 6.5% SB produced by DIC.

Other organic acid metal salts capable of being used as the dryer include organic acid cobalt boron metal salts and organic acid manganese boron metal salts. These may be used singly or in combination. Combined use thereof is advantageous for drying thick coating films that are considered to be difficult to harden uniformly. Furthermore, combined use of an organic acid cobalt boron metal salt, an organic acid manganese boron metal salt, and an organic acid manganese metal salt is also advantageous for drying thick coating films. Also, combined use of an organic acid cobalt boron metal salt and an organic acid manganese metal salt advantageously provides an inexpensive dryer that satisfactorily promotes drying.

The organic acid metal salt used in the present embodiment can be produced by a known method without particular limitation, and, for example, the method disclosed in JP-B-63-63551 may be applied.

The organic acid metal salt may be diluted with an organic solvent in advance before being added to the oil-based ink, from the viewpoint of ease handling and uniformity of the mixture. Any organic solvent may be used as diluent as long as it can uniformly dissolve the organic acid metal salt and is chemically inert to the organic acid metal salt, and examples thereof include hydrocarbons, such as toluene, xylene, heptane, hexane, cyclohexane, and mineral spirit; alcohols, such as methanol, ethanol, propanol, and cyclohexanol; ketones, such as methyl ethyl ketone, methyl isobutyl ketone, and cyclohexanone; and ethers, such as propyl ether, methyl cellosolve, cellosolve, butyl cellosolve, methyl Carbitol, and butyl Carbitol. These may be used singly or in combination.

2-2. 4. Preparation of Oil-Based Ink

The oil-based ink used in the present embodiment can be prepared by a conventional method. If a pigment is used as the coloring material, a pigment dispersion liquid having desired properties is first prepared by mixing the pigment, a dispersant, and a portion of an organic solvent, and agitating the mixture with a ball mill, a bead mill, an ultrasonic mill, a jet mill, or the like. Subsequently, the rest of the organic solvent and other additives, such as a surfactant and a binder resin, are added to the dispersion liquid with stirring to yield the oil-based ink.

2-2. 5. Physical Properties

Preferably, the oil-based ink has a surface tension at 20° C. in the range of 20 mN/m to 50 mN/m, more preferably in the range of 25 mN/m to 40 mN/m, from the viewpoint of the balance between the quality of printed matter and the reliability of the ink as an ink jet ink. The surface tension can be determined by measuring the ink wetting a platinum plate at 20° C. with an automatic surface tensiometer CBVP-Z (manufactured by Kyowa Interface Science).

Also, from the same viewpoint as above, the oil-based ink preferably has a viscosity in the range of 2 mPa·s to 30 mPa·s, more preferably in the range of 2 mPa·s to 20 mPa·s, at 20° C. The viscosity can be measured with a viscoelasticity meter MCR-300 (manufactured by Anton Paar Japan K.K.) by increasing the shear rate to 10 to 1000 at 20° C. and reading the indicated value of the meter at a shear rate of 200.

2-2. 6. Use

The oil-based ink used in the present embodiment is introduced to an ink cartridge of a known ink jet printing apparatus, and droplets of the ink are ejected onto a print medium, thus printing images. Preferably, the ink jet printing apparatus includes an electrostrictive element that vibrates according to electrical signals and is configured to eject ink by the vibration of the electrostrictive element. Also, combined use of the oil-based ink with the above-described pretreatment liquid prevents the resulting printed matter from deforming the clear folder for a long time.

2-3. Oil-Based Ink Jet Printing Method

The oil-based ink jet printing method according to an embodiment of the invention will now be described. The oil-based ink jet printing method includes printing with an oil-based ink jet printing ink set including the above-described pretreatment liquid and oil-based ink.

2-3. 1. Ink Jet Printing Apparatus

An exemplary ink jet printing apparatus used for the ink jet printing method of the present embodiment will be described with reference to FIGURE. The oil-based ink jet printing method may be used in any ink jet printing apparatus without particular limitation.

The ink jet apparatus may be an ink jet printer (hereinafter, printer) including an ink jet head as shown in, for example, the FIGURE. The printer 1 shown in FIGURE is an apparatus that prints images and the like on the surface of a print medium 2, such as a printing paper sheet, by ejecting a liquid ink onto the surface of the medium. The printer 1 includes an ink jet head 3, a carriage 4 on which the ink jet head 3 is mounted, a carriage moving mechanism 5 configured to move the carriage 4 in main moving directions (longitudinal directions of the printer 1, or width directions of the print medium 2), and a transport mechanism 6 configured to transport the print medium 2 in a sub moving direction perpendicular to the main moving directions.

The pretreatment liquid and oil-based ink used in the ink jet printing apparatus are stored in an ink cartridge 7. The ink cartridge 7 is removable from the ink jet head 3. In an embodiment, the ink cartridge 7 may be disposed at the body of the printer 1 so that the pretreatment liquid and the ink are fed to the ink jet head 3 from the ink cartridge 7 through an ink feeding tube.

The carriage moving mechanism 5 includes a timing belt 8. The timing belt 8 is driven by a pulse motor 9, such as a DC motor. On actuating the pulse motor 9, the carriage 4 moves reciprocally in the main moving directions along a guide rod 10 extending in the printer 1.

A platen 11 is located below the ink jet head 3 during printing. The platen 11 is disposed away from the surface at which the nozzles are arranged (nozzle plate, not shown) of the ink jet head 3 during printing and supports the print medium 2. The platen 11 has a flushing box 12 at an end thereof in the main moving directions, that is, in a region outside the region (printing region) where the ink is deposited on the print medium 2 on the platen 11. The flushing box 12 is a member into which the pretreatment liquid and the ink are ejected from the ink jet head 3 for preliminary ejection. In the present embodiment, the flushing box 12 is in the form of a box open on the upper side (open toward the ink jet head 3). Also, the flushing box 12 is provided with an ink absorption member (not shown) made of, for example, urethane sponge on the inner bottom surface thereof. Although it is advantageous that the flushing box 12 be disposed at both ends of the platen 11 in the main moving directions, it may be disposed at one end.

The ink jet head 3, which is a device to apply the pretreatment liquid and the oil-based ink onto the print medium 2, includes nozzles (not shown) through which the pretreatment liquid or the oil-based ink is ejected. For ejecting the pretreatment liquid or the oil-based ink, various techniques may be applied. For example, electrostatic suction may be used. In this case, a strong electric field is applied between the nozzles and an acceleration electrode disposed in front of the nozzles so as to eject droplets of a predetermined liquid or an ink continuously through the nozzles, and printing information signals are transmitted between deflection electrodes to control the droplets of a reaction liquid flying between the deflection electrodes. The pretreatment liquid and the oil-based ink may be forcibly ejected as droplets by pressurizing the reaction liquid with a small pump and mechanically vibrating the nozzles with a quartz resonator. A piezoelectric method may be applied. In this case, a pressure and a printing information signal are simultaneously applied to the pretreatment liquid and the oil-based ink with a piezoelectric element to eject droplets of the pretreatment liquid and the oil-based ink for printing. Alternatively, a thermal jet method may be applied. In this case, the pretreatment liquid or the oil-based ink is foamed by being heated with a miniature electrode according to printing information signals, thereby ejected for printing.

The ink jet head 3 may be a line head or a serial head. In the present embodiment, a serial ink jet head is used.

The ink jet printing apparatus including a serial ink jet head performs printing by a plurality of number of times of scanning operation (pass) for ejecting ink while moving the printing head relatively to the print medium. For example, the serial ink jet printing head may be mounted on a carriage that moves in a width direction of the print medium (perpendicular to the direction in which the print medium is transported) and ejects droplets while moving accompanying the movement of the carriage.

In the case of using an ink jet printing apparatus including a line head, the ink jet printing apparatus performs printing by a single operation of scanning (pass) for ejecting ink onto the print medium while moving the printing head relatively to the print medium. An example of such a line ink jet printing apparatus may be such that the printing head is wider than the width of the print medium so that droplets can be ejected onto the print medium without moving the head.

The ink jet apparatus may further include a dryer (not shown). The dryer can rapidly evaporate and remove the liquid medium of the pretreatment liquid or the oil-based ink on the printed medium, thus helping rapid formation of a printed image or the like. The dryer may be of any type as long as it has a mechanism to promote evaporation to remove the liquid medium of the pretreatment liquid or the oil-based ink. For example, the dryer may have a device capable of applying heat to the print medium, a device capable of blowing air on the pretreatment liquid or the oil-based ink, or a unit including both of these devices. More specifically, the dryer may be a forcible air heater, a radiation heater, a conductive heater, a high-frequency dryer, or a microwave dryer.

Preferably, the drying with the dryer is performed by heating, and the ink jet printing apparatus ejects liquid onto a heated print medium for printing. Heating may be performed by, but not limited to, a heat press method, a normal-pressure steaming method, a high-pressure steaming method, or a thermal fixing method. For heating the print medium, an infrared lamp may be used. In this instance, the print medium is preferably heated to a temperature in the range of 30° C. to 50° C., more preferably in the range of 30° C. to 40° C. Thus, the ink is more rapidly dried in the printing step.

2-3. 2. Print Medium

In the present embodiment, any print medium may be used without particular limitation, and examples thereof include plain paper, coated paper, plastic films, cloth, and leather. Also, the print medium may be non-absorbent or low-absorbent of ink.

An ink-low-absorbent or ink-non-absorbent print medium mentioned herein refers to a print medium that hardly absorb or does not absorb ink. Quantitatively, the ink-non-absorbent or ink-low-absorbent print medium exhibits a water absorption of 10 mL/m$^2$ or less for a period of 30 ms$^{1/2}$ from the beginning of contact with water, measured by Bristow's method. The Bristow's method is broadly used as a method for measuring liquid absorption for a short time, and Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000). An ink-absorbent print medium refers to that not classified as an ink-non-absorbent or ink-low-absorbent print medium.

The ink-non-absorbent print medium may be a plastic film not provided with an ink-absorbing layer, or a paper sheet or any other base material coated with or bonded to a plastic film. The plastic mentioned here may be polyvinyl chloride, polyethylene terephthalate, polycarbonate, polystyrene, polyurethane, polyethylene, or polypropylene.

The ink-low-absorbent print medium may be provided with a coating layer capable of receiving ink on the surface thereof. The ink-low-absorbent print medium having a paper base may be a book-printing paper, such as art paper, coated paper, or matte paper, and that having a plastic base may be a film of polyvinyl chloride, polyethylene terephthalate, polycarbonate, polystyrene, polyurethane, polyethylene, polypropylene, or the like coated with a hydrophilic polymer or a coating formed by applying silica or titanium particles together with a binder. The print medium may be transparent.

2-3. 3. Pretreatment

In the present embodiment, pretreatment is the operation of applying the pretreatment liquid according to an embodiment of the invention to a print medium by ejecting droplets of the pretreatment liquid onto the print medium from an ink jet head. The pretreatment liquid may be applied as described above by for example, immersing the print medium in the pretreatment liquid, using a roll coater or the like, or ejecting the pretreatment liquid. For ejecting the pretreatment liquid, an ejection apparatus using a spraying method or an ink jet method may be used. In the present embodiment, the pretreatment liquid is applied by ejecting droplets of the pretreatment liquid onto the print medium 2 from the ink jet head 3.

The amount of the pretreatment liquid applied is preferably in the range of 0.1 mg/cm$^2$ to 30.0 mg/cm$^2$, more preferably in the range of 0.4 mg/cm$^2$ to 10 mg/cm$^2$. When the pretreatment liquid is applied in such a range, the resulting printed matter is favorably stored in a clear folder. In addition, the pretreatment liquid can be dried in a short time, and thus printing speed can be increased.

The method may include drying the applied pretreatment liquid before applying the oil-based ink. This drying step is preferably stopped in a state where the pretreatment liquid is still wet, from the viewpoint of helping the alcohol exchange reaction in the ink with the aluminum chelate compound in the printing step described below. The pretreatment liquid may be naturally dried, or may be heated for drying from the viewpoint of increasing drying speed and helping the resin in the pretreatment liquid to fuse with the print medium. If the pretreatment liquid is dried by heating, the heating may be performed by, but not limited to, a heat press method, a normal-pressure steaming method, a high-pressure steaming method, or a thermal fixing method. The heat source for this heating may be, but is not limited to, infrared rays (lamp).

2-3. 4. Application of Oil-Based Ink (Printing)

Subsequently, the oil-based ink is applied onto the surface of the print medium pretreated with the pretreatment liquid to print an image. Thus, the image of the oil-based ink is formed on the surface of the print medium.

The term "image" mentioned herein refers to a printed pattern defined by dots, including a printed character and a solid pattern. A solid pattern mentioned herein refers to a pattern defined by only pixels filled with printed dots in such a manner that the printing region of the print medium is covered with an ink so that the surface of the print medium is not visible, and the pixel refers to the minimum unit of a printing area, defining a printing resolution.

The maximum amount of the oil-based ink applied to the surface of the print medium is preferably in the range of 5 mg/inch$^2$ to 15 mg/inch$^2$. When the maximum amount of the oil-based ink applied to the surface of the print medium is in this range, the printed matter can be more favorably stored in a clear folder, and printing speed is increased.

After printing, the oil-based ink deposited on the print medium may be dried in a drying step. In this instance, it is advantageous to dry the oil-based ink to the extent that the solid pattern does not have a sticky feel. Although the oil-based ink may be dried by natural drying, it is advantageous to dry the oil-based ink by heating from the same viewpoint as in the step of drying the pretreatment liquid. The heating of the oil-based ink may be performed by, but not limited to, any of the above-mentioned heating methods.

In the oil-based ink jet printing method of the present embodiment, the print medium is pretreated with the pretreatment liquid before printing with the oil-based ink. This pretreatment reduces the deformation of the clear folder caused by the adverse effect of the organic solvent in the printed image. Also, the clear folder is kept from being deformed by printed matter created with the oil-based ink for a long time.

2-4. Examples

The subject matter of the invention will now be further described in detail with reference to Examples and Comparative Examples. However, the invention is not limited to the Examples.

2-4. 1. Preparation of Pretreatment Liquid

Each of pretreatment liquids 1 and 2 was prepared by mixing the materials and stirring the mixture according to the composition (in terms of percent by mass) shown in Table 4.

TABLE 4

| | Pretreatment liquid 1 | Pretreatment liquid 2 |
|---|---|---|
| Aluminum chelate compound 1 | 10 | 0 |
| Aluminum chelate compound 2 | 0 | 10 |
| 2-Propanol | 90 | 90 |

In Table 4, aluminum chelate compound 1 is the compound represented by the following formula (3), and aluminum chelate compound 2 is the compound represented by the following formula (4).

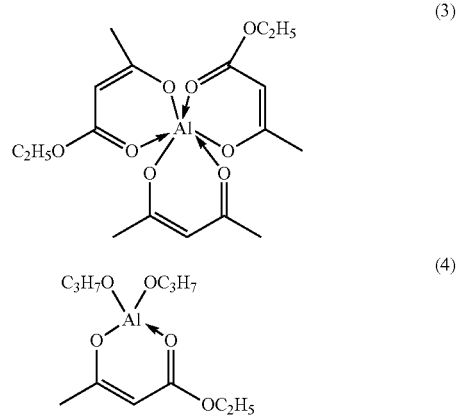

2-4. 2. Preparation of Oil-Based Ink Composition

Materials were mixed according to the composition (in terms of percent by mass) shown in Table 5 and were completely dissolved by stirring. The resulting solution was filtered through a membrane filter of 1 μm in pore size to yield an oil-based ink composition.

TABLE 5

| | Ink 1 | Ink 2 | Ink 3 |
|---|---|---|---|
| Hexadecyl alcohol | 99 | 0 | 0 |
| Dodecyl alcohol | 0 | 99 | 0 |
| Oleyl alcohol | 0 | 0 | 99 |
| Oil-based dye 1 | 1 | 1 | 1 |

In Table 5, the oil-based dye was Neozapon Blue 807 (produced by BASF).

2-4. 3. Clear Folder Modification Test

The pretreatment liquid was applied to Monochrome Copy/Printer Paper P (manufactured by Fuji Xerox) with a bar coater (wire number: No. 2), followed by air-drying for 12 hours. Next, each of the oil-based ink compositions was introduced into an ink cartridge of an ink jet printer PX-M 7050F (manufactured by Seiko Epson) modified for the test, and a solid pattern in a 20 cm×28 cm rectangular shape was printed with the ink on a sheet of double-sided high-quality plain paper (manufactured by Seiko Epson). The printed sheet was put into a PP clear folder. The clear folder holding the printed sheet was allowed to stand in a laid position in an environment of 23° C. in temperature and 50% in relative humidity for 30 days. Then, the degree of the outward warp of the clear folder was measured with a ruler, and the measured value was evaluated as the degree of deformation. The results were rated as follows:

5: Deformation degree of less than 10 mm

4: Deformation degree in the range of 10 mm to less than 30 mm

3: Deformation degree in the range of 30 mm to less than 50 mm

2: Deformation degree in the range of 50 mm to less than 100 mm
1: Deformation degree of 100 mm or more

TABLE 6

|  | Example 1 | Example 2 | Example 3 |
|---|---|---|---|
| Pretreatment liquid | Pretreatment liquid 1 | Pretreatment liquid 2 | Pretreatment liquid 1 |
| Ink | Ink 1 | Ink 1 | Ink 2 |
| Clear folder storage | 4 | 4 | 3 |

|  | Example 4 | Comparative Example 1 | Comparative Example 2 |
|---|---|---|---|
| Pretreatment liquid | Pretreatment liquid 1 | — | — |
| Ink | Ink 3 | Ink 1 | Ink 2 |
| Clear folder storage | 5 | 1 | 1 |

2-4. 4. Evaluation Results

Evaluation results are shown in the bottom row of Tables 6. Comparative Examples 1 and 2, in which the pretreatment liquid was not used, resulted in a large deformation degree of the clear folder, thus inferior in clear folder storage. On the other hand, the Examples, which used a pretreatment liquid containing an aluminum chelate compound, exhibited smaller deformation of the clear folder than in Comparative Examples 1 and 2, thus superior in storage. In the present embodiment of the invention, as described above, the pretreatment liquid containing an aluminum chelate compound is used for pretreatment. This considerably suppresses the deformation of the clear folder and enables the clear folder to be kept for a long time from being deformed by printed matter created with the oil-based ink.

The invention is not limited to the above-described embodiments and Examples, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosures of Japanese Patent Application No. 2016-011360, filed Jan. 25, 2016 and 2016-011361, filed Jan. 25, 2016 are expressly incorporated by reference herein.

What is claimed is:

1. A pretreatment liquid for an oil-based ink, the pretreatment liquid comprising one of a maleic anhydride resin derivative and an aluminum chelate compound,
wherein the aluminum chelate compound is represented by one of the following formulas (1) and (2):

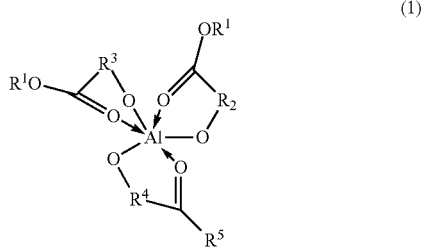

(1)

wherein $R^1O$ represents a volatile alkoxy group, $R^2$, $R^3$, and $R^4$ each represent an alkyl group, and $R^5$ represents a methyl group or $R^1O$; and

(2)

wherein $R^6O$ represents a volatile alkoxy group, and $R^7$ represents an alkyl group.

2. The pretreatment liquid according to claim 1, wherein the oil-based ink contains an organic solvent being at least one selected from the group consisting of alcohols, primary amines, and secondary amines, and wherein the pretreatment liquid contains a maleic anhydride resin derivative.

3. The pretreatment liquid according to claim 2, wherein the organic solvent has a carbon number of 12 or more.

4. An oil-based ink jet printing ink set comprising the pretreatment liquid as set forth in claim 3.

5. An oil-based ink jet printing method comprising printing with the oil-based ink jet printing ink set as set forth in claim 4.

6. An oil-based ink jet printing ink set comprising the pretreatment liquid as set forth in claim 2.

7. An oil-based ink jet printing method comprising printing with the oil-based ink jet printing ink set as set forth in claim 6.

8. The pretreatment liquid according to claim 1, wherein the maleic anhydride resin derivative is at least one selected from the group consisting of rosin-modified maleic anhydride resins, acrylic-modified maleic anhydride resins, and styrene-modified maleic anhydride resins.

9. An oil-based ink jet printing ink set comprising the pretreatment liquid as set forth in claim 8.

10. An oil-based ink jet printing method comprising printing with the oil-based ink jet printing ink set as set forth in claim 9.

11. The pretreatment liquid according to claim 1, wherein the oil-based ink contains an organic solvent that is a higher alcohol having a carbon number of 12 or more.

12. An oil-based ink jet printing ink set comprising the pretreatment liquid as set forth in claim 11.

13. An oil-based ink jet printing method comprising printing with the oil-based ink jet printing ink set as set forth in claim 12.

14. An oil-based ink jet printing ink set comprising the pretreatment liquid as set forth in claim 1.

15. An oil-based ink jet printing method comprising printing with the oil-based ink jet printing ink set as set forth in claim 14.

16. An oil-based ink jet printing ink set comprising:
an oil-based ink; and
a pretreatment liquid comprising one of a maleic anhydride resin derivative and an aluminum chelate compound.

17. The oil-based ink jet printing ink set according to claim 16, wherein the oil-based ink contains an organic solvent being at least one selected from the group consisting of alcohols, primary amines, and secondary amines, and wherein the pretreatment liquid contains a maleic anhydride resin derivative.

18. The oil-based ink jet printing ink set according to claim 16, wherein the maleic anhydride resin derivative is at least one selected from the group consisting of rosin-modified maleic anhydride resins, acrylic-modified maleic anhydride resins, and styrene-modified maleic anhydride resins.

19. The oil-based ink jet printing ink set according to claim 17, wherein the organic solvent has a carbon number of 12 or more.

20. The oil-based ink jet printing ink set according to claim 16, wherein the aluminum chelate compound is represented by one of the following formulas (1) and (2):

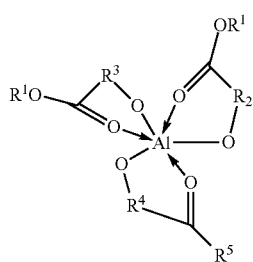
(1)

wherein $R^1O$ represents a volatile alkoxy group, $R^2$, $R^3$, and $R^4$ each represent an alkyl group, and $R^5$ represents a methyl group or $R^1O$; and

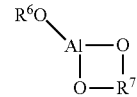
(2)

wherein $R^6O$ represents a volatile alkoxy group, and $R^7$ represents an alkyl group.

21. The oil-based ink jet printing ink set according to claim 16, wherein the oil-based ink contains an organic solvent that is a higher alcohol having a carbon number of 12 or more.

* * * * *